United States Patent
Seddigh et al.

(10) Patent No.: US 7,557,689 B2
(45) Date of Patent: Jul. 7, 2009

(54) ALERTING METHOD, APPARATUS, SERVER, AND SYSTEM

(75) Inventors: Nabil Seddigh, Kanata (CA); Biswajit Nandy, Kanata (CA); Rupinder Singh Makkar, Kanata (CA); Donald William Arthur Bennett, Orleans (CA)

(73) Assignee: Solana Networks Inc., Ottawa, Ontario (CA)

( * ) Notice: Subject to any disclaimer, the term of this patent is extended or adjusted under 35 U.S.C. 154(b) by 337 days.

(21) Appl. No.: 11/601,750

(22) Filed: Nov. 20, 2006

(65) Prior Publication Data

US 2008/0117075 A1 May 22, 2008

(51) Int. Cl.
*G08B 9/00* (2006.01)
(52) U.S. Cl. .............. 340/286.06; 340/286.02; 340/286.11
(58) Field of Classification Search ............ 340/286.01, 340/286.02, 286.06, 286.07, 286.11, 287, 340/539.1, 506; 707/104.1, 200; 709/223, 709/224, 206; 701/104.1, 200
See application file for complete search history.

(56) References Cited

U.S. PATENT DOCUMENTS

| | | | | |
|---|---|---|---|---|
| 5,696,486 A * | 12/1997 | Poliquin et al. | ............. | 340/506 |
| 6,893,396 B2 * | 5/2005 | Schulze et al. | ............. | 600/300 |
| 7,113,085 B2 * | 9/2006 | Havekost | ................ | 340/506 |
| 7,143,118 B2 * | 11/2006 | Eichstaedt et al. | .......... | 707/201 |
| 7,318,089 B1 * | 1/2008 | Stachura et al. | ............. | 709/223 |
| 7,334,001 B2 * | 2/2008 | Eichstaedt et al. | ....... | 707/104.1 |
| 7,346,630 B2 * | 3/2008 | Eichstaedt et al. | ....... | 707/104.1 |

* cited by examiner

*Primary Examiner*—Van T. Trieu
(74) *Attorney, Agent, or Firm*—Victoria Donnelly

(57) ABSTRACT

An alert system for a communications network has a plurality of client devices and a plurality of alert servers each adapted to provide alerts to a respective subset of the client devices to provide scalability. Users at the client devices subscribe to receive alerts by selecting a scope of distribution of alerts. The selection involves selecting a type of alert to receive, a level of severity of alerts to receive, and a geographic scope. In response to receiving a request to issue an alert, an alert server notifies the other alert servers of the alert. Each alert server determines which client devices of the respective subset of client devices are to receive the alert. Each alert server then sends an alert message to its client devices that are to receive the alert.

20 Claims, 21 Drawing Sheets

INCOMING ALERT!

RECEIVED ON: — 482

FEB 7, 2005 2:46:06 PM

SENT BY: — 484

JOHN DOE

ORGANIZATION: — 486

ACME INC.

REGION: — 488

NEW YORK

ALERT TYPE: — 490

WEATHER ALERT

LEVEL OF SEVERITY: — 492

LEVEL 5

ALERT MESSAGE: — 494

120 CM OF SNOW EXPECTED OVERNIGHT: STAY HOME

| SERVER ID | IP ADDRESS | GEOGRAPHIC REGION |
|---|---|---|
| 1 | 194.165.1.1 | New York |
| 2 | 168.192.1.2 | Seattle |
| 3 | 134.125.2.1 | Maine |

FIG. 5

ALERTING METHOD, APPARATUS, SERVER, AND SYSTEM

FIELD OF THE INVENTION

This invention relates to a method, apparatus, and system in communications networks for providing alerts to the public and/or other entities.

BACKGROUND

Disaster and emergency situations can arise at any time or place with the potential of endangering lives and damaging community infrastructure. Public officials have the responsibility of giving public directions and issuing public alerts or early warnings in the event of such emergencies. Furthermore, in the private sector there is interest in disseminating information in the form of alerts or warnings to individuals. Diverse media, such as television, radio, public telephony systems (satellite, land-line and wireless), electronic billboards, and the Internet for example, are available to distribute public alerts.

Traditionally, sirens, radio and television have been the primary means for alerting the public. For example, there is a system called EAS (Emergency Alert System), which is used by the United States Government. In this system, alerts are distributed via over-the-air broadcast signals and cable systems. This is a hierarchical trickle down distribution system where alerts are relayed down a hierarchical chain. In such a model important messages may be lost along the chain. For example, radio and television stations sometimes decide not to air messages or delay the messages. Furthermore, traditional media such as television and radio have limited daytime audiences since many people who are at work do not have access to radio or television.

In recent years, satellite-based receivers as well as automated phone dialers have also been used for emergency public alerting and warning. More recently, the Internet has emerged as a complementary means for issuing real-time secure alerts, especially during working hours in large urban centers.

Email-based public alerting provides one mechanism for disseminating alerts. However, this approach of alerting is not effective since people tend not to read emails immediately. In addition, emails can be easily spoofed to cause false alarms and panic. Furthermore, in an email approach to distributing alerts bulk emails are sent to subscribers and anti-spam software used by the subscribers can accidentally block important alerting messages.

There are systems that use modern technologies, such as the Internet and cellular networks, to directly deliver alerts to workstations and mobile handsets of wireless subscribers. For example, there are satellite based warning systems that provide mechanisms for disseminating alerts from a primary station to a secondary station for broadcast. However, such systems are not efficient in providing direct alerting to end-users.

There are few Internet-based public alerting systems. Most of such systems were initially developed as messaging systems, and they are limited in the number of clients they can serve. This imposes serious limitations on the scalability of these systems. In addition, there are no inherent security features in the existing alerting systems to provide secure alerting functionality.

A number of messaging systems have been adapted for use in dissemination of public alerts to end-users. These systems were originally designed for chat client based environments and are limited in their scalability.

Therefore, there is a need in the industry for the development of an improved and more efficient alert system and method for reaching a large number of users in a short period of time.

SUMMARY OF THE INVENTION

An alert system for a communications network has a plurality of client devices and a plurality of alert servers. The alert servers communicate with each other to provide a peer-to-peer network wherein each alert server provides alerting functionality to a respective subset of the client devices. This provides scalability to the alerting system wherein additional alert servers are added when the number of client devices increases. Users at the client devices subscribe to receive alerts by selecting a scope of distribution of alert. In some implementations, the selection involves selecting a type of alert to receive, a level of severity of alerts to receive, and a geographic scope. Issuers of alerts, such as public officials for example, issue alerts by sending requests to the alert servers. In response to receiving a request to issue an alert, an alert server notifies the other alert servers of the alert. Each alert server determines which client devices of the respective subset of client devices are to receive the alert. Each alert server then sends an alert message to its client devices that are to receive the alert.

In some embodiments of the invention, a UDP (User Datagram Protocol) is used as the transport protocol to send alert messages and provide an efficient use of bandwidth. Furthermore, in some implementations an alert message includes a plurality of data packets, and a client server receiving the alert message determines whether it has received all data packets within the alert message. If one or more data packets are missing, the client device sends a NACK (Negative ACKnowledgement) message to the alert server indicating that not all data packets have been received. The alert server responds by re-sending the alert message to the client device. Sending NACK messages only when there is a problem with received alert messages provides reliable alerting functionality while simultaneously effectively making use of bandwidth. In addition, in some implementations a client device periodically sends messages containing information on alerts received to its alert server. The alert server determines whether the client device has received all alerts that have been issued and directed to the client device. If an alert intended for the client device has not been received, the alert server sends to the client device an alert message associated with the alert. The peer-to-peer alerting architecture in which the alerting functionality is distributed among alert servers, together with the above mechanism for reliable alerting, provide a highly scalable, efficient, and reliable mechanism for providing secure alerting functionality. In some implementations the alerting system is used as an early warning system and/or a last mile hazard warning system.

According to one aspect of this invention there is provided an alert server having an alert manager. The alert manager has a processor and a memory containing program instructions executable by the processor for alerting. The alert manager has: i) a receiver unit for receiving requests to issue alerts; ii) a peer communications unit for notifying at least one other alert server of the alerts; iii) a distribution unit for determining from a plurality of subscribers which of the plurality of subscribers are to receive the alerts; and, iv) a transmitter unit for sending alert messages to the subscribers that are to receive the alerts.

In some embodiments of the invention, the peer communications unit maintains a list of active alert servers and distributes the list of active alert servers to the active alert servers.

In some embodiments of the invention, the peer communications unit updates the list of active alert servers to include another alert server in response to receiving a registration request from the other alert server.

In some embodiments of the invention, the alert server has an administration manager for assigning to the other alert server a respective plurality subscribers to be alerted by the other alert server.

In some embodiments of the invention, the alert server has an administration manager for assigning to the other alert server a geographic region over which the other alert server is to provide alerting functionality.

In some embodiments of the invention, the alert manager has a backup unit for providing backup alerting functionality on behalf of another alert server.

In some embodiments of the invention, the alert server has a user manager for receiving subscription requests from the plurality of subscribers. Each subscription request contains a respective request to receive alerts of a particular scope of distribution. The particular scope of distribution has at least one of a type of alert, a level of severity, and a geographic scope. The alert manager has a distribution unit for sending alerts within the particular scope of distribution of each subscription request.

In some embodiments of the invention, the alert server has a user manager for receiving subscription requests from the plurality of subscribers. Each subscription request contains a respective request to receive alerts of a particular level of severity. The alert manager has a distribution unit for sending alerts having the particular level of severity and alerts having a level of severity higher than the particular level of severity of each subscription request.

In some embodiments of the invention, the alert server has a user manager for receiving subscription requests from the plurality of subscribers. Each subscription request contains a respective request to receive alerts of a particular geographic scope. The alert manager has a distribution unit for sending alerts having the particular geographic scope and alerts having a larger geographic scope that covers the particular geographic scope of each subscription request.

In some embodiments of the invention, the alert manager receives requests to issue alerts from issuers of alerts. The alert server has a security manager for determining whether the issuers of alerts have a necessary security clearance level to issue the alerts, and for instructing the alert manager to issue the alerts in response to a determination that the issuers of alerts have the necessary security clearance level.

In some embodiments of the invention, the alert manager has a UDP unit for sending the alert messages using a UDP-based transport protocol.

In some embodiments of the invention, each alert message contains a plurality of data packets. The alert manager has a NACK (Negative ACKnowledgement) unit for sending the alert message to a client device in response to receiving a NACK message from the client device indicating that at least one of the data packets has not been received.

In some embodiments of the invention, the alert manager has a messaging reliability unit having: i) means for receiving a message containing alert information from a client device; ii) means for determining whether the client device has received the alert message using the alert information; and, iii) means for re-sending the alert message to the client device in response to a determination that the client device has not received the alert message.

In some embodiments of the invention, the alert manager has a messaging reliability unit for determining whether a client device has received the alert message responsive to receiving from the client device a registration request to establish a connection for receiving alerts. The messaging reliability unit is also adapted to send the alert message to the client device in response to a determination that the client device has not received the alert message.

In some embodiments of the invention, the alert manager has a statistics reporting unit for maintaining statistical information on alerts.

In some embodiments of the invention, each alert message contains alerting information in at least one of a plurality of media formats consisting of a text media format, a video media format, and an audio media format.

According to another aspect of this invention there is provided an apparatus for receiving alerts. The apparatus has a registration handler having a processor and a memory containing program instructions executable by the processor for alerting. The registration handler has: i) an account creation unit for creating a user account with an alert server in response to receiving instructions to create the user account with the alert server; and, ii) a subscription unit for subscribing with the alert server to receive alerts. The apparatus has a session registration unit for registering with the alert server to establish a connection with the alert server and receive alert messages. The apparatus also has an alert handler for providing alerts in response to receiving the alert messages.

In some embodiments of the invention, the instructions contain at least one of user instructions and instructions from a central alert server.

In some embodiments of the invention, the apparatus is any one of a PC (Personal Computer), a phone, a cell phone, and a PDA (Personal Digital Assistant), for example.

In some embodiments of the invention, the subscription unit has means for subscribing with the alert server to receive alerts having a particular scope of distribution in response to receiving user instructions to receive alerts of the particular scope of distribution.

In some embodiments of the invention, the session registration handler has means for registering with a backup alert server to establish a connection with the backup alert server and receive alert messages in response to receiving a message from the backup alert server indicating that the backup alert server is to provide alerting functionality.

According to another aspect of this invention there is provided alert system for a communications network. The alert system has a plurality of client devices and a plurality of alert servers. Each alert server is adapted to provide alerts to a respective subset of the client devices in response to receiving requests to issue alerts. Each alert server has: i) means for notifying the other alert servers of the alerts; ii) means for determining which client devices of the respective subset of the client devices are to receive the alerts; and, iii) means for sending alert messages to the client devices that are to receive the alerts.

According to another aspect of this invention there is provided a method of alerting. The method involves, at an alert server: i) receiving requests to issue alerts; ii) notifying at least one other alert server of the alerts; iii) from a plurality of subscribers, determining which of the plurality of subscribers are to receive the alerts; and, iv) sending alert messages to the subscribers that are to receive the alerts.

According to another aspect of this invention there is provided an article of manufacture. The article of manufacture has a computer usable medium having computer readable program code means embodied therein for alerting. The computer readable code means in the article of manufacture has: a) computer readable code means for receiving requests to issue alerts; b) computer readable code means for notifying at least one other alert server of the alerts; c) computer readable code means for determining from a plurality of subscribers which subscribers are to receive the alerts; and, d) computer readable code means for sending alert messages to the subscribers that are to receive the alerts.

BRIEF DESCRIPTION OF THE DRAWINGS

The invention will be further understood from the following description by way of example with reference to the accompanying drawings, in which:

FIG. 2F is an exemplary alert GUI displayed at the client device of FIG. 2A when an alert is issued;

FIG. 5 is an exemplary list of alert servers maintained by alert servers in the alert system of FIG. 1;

DETAILED DESCRIPTION

An alert system for disseminating alerts in accordance with embodiments of the invention will now be described. Most the example implementations will be described in the context of a public alerting system in which a public official issues an alert to alert the public. However, it is to be clearly understood that described implementations are not limited to applications in the public sector where members of the public are alerted, and in some implementations other individuals or entities such as employers and/or employees of private businesses for example are alerted. For example, in some implementations employees of a business subscribe for receiving alerts and an administrator within the business issues alerts.

Figure 1:
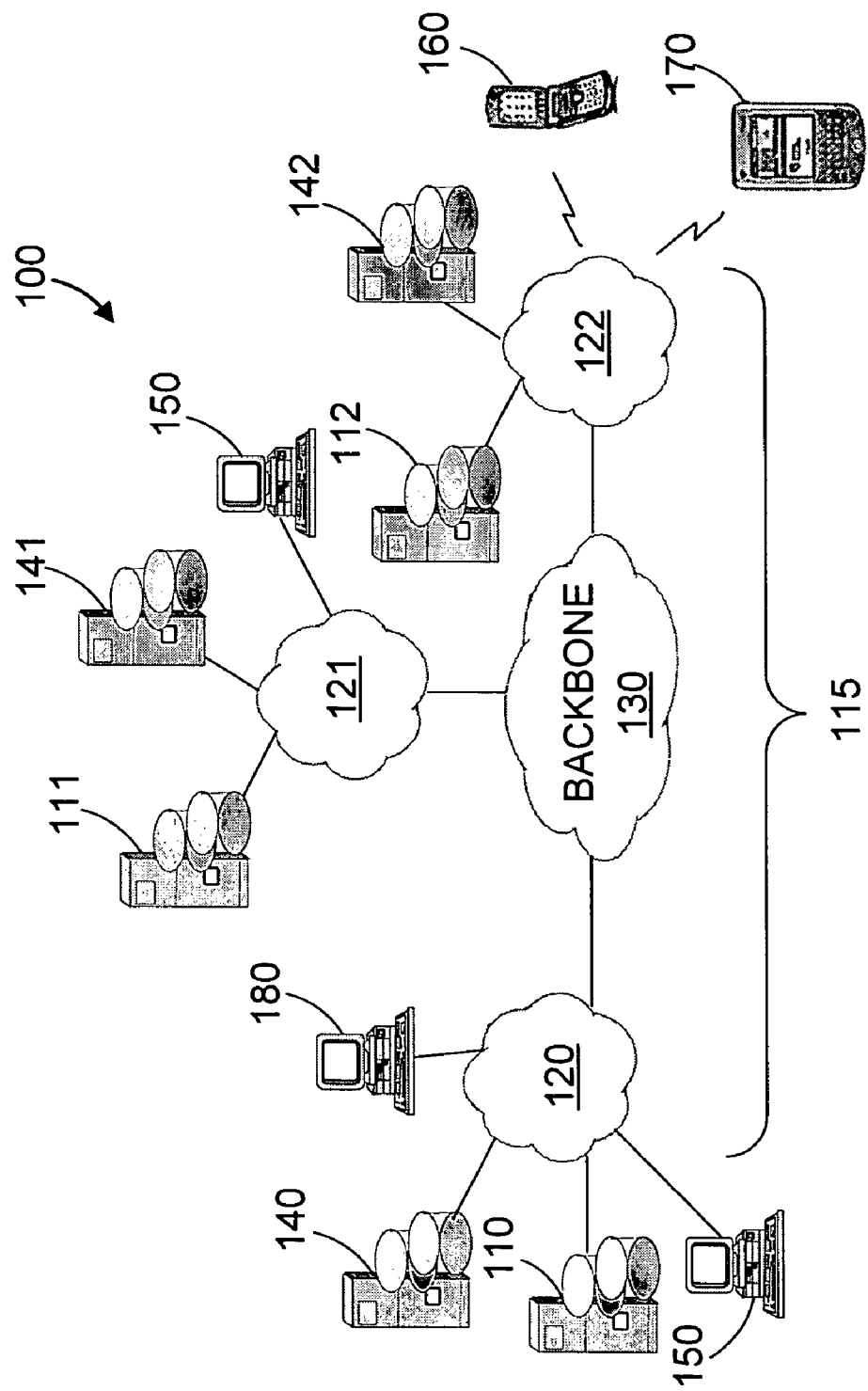
FIG. 1 is an alert system for alerting clients, in accordance with an embodiment of the invention.

Referring to FIG. 1, shown is an alert system for alerting clients, in accordance with an embodiment of the invention. The alert system is generally indicated by 100 and has alert servers 110, 111, 112 connected to the Internet 115. The Internet 115 is shown divided into geographic regions 120, 121, 122 and an Internet backbone 130. PCs (Personal Computers) 150, 180, backup alert servers 140, 141, 142, cell phone 160, and PDA (Personal Digital Assistant) 170 are also connected to the Internet 115.

Alert servers 110, 111, 112 provide alerting functionality within geographic regions 120, 121, 122, respectively. In some implementations, each geographic region 120, 121, 122 represents a business, a city, part of a city, a state or province, or a region, for example. Users at any one of PCs 150, cell phone 160, and PDA 170 subscribe for receiving alerts. Individuals having access to the alerting system 100, such as public officials in charge of alerting the public of weather conditions, for example, issue alerts using the alert system 100. For example, to issue a hurricane warning a public official logs in on PC 180 and issues the alert. Information on the alert is sent to the alert server 110 serving geographic region 120. The alert server 110 notifies alert severs 111, 112 of the alert. Each one of the alert severs 110, 111, 112 determines what subscribers are to receive the alert and sends the alert to the subscribers within their respective geographic region 120, 121, 122. For purposes of backup functionality, the alert servers 110, 111, 112 serve as primary alert servers for the backup alert servers 140, 141, 142, respectively. The backup alert servers 140, 141, 142 periodically retrieve data from the alert servers 110, 111, 112, respectively, for providing backup alerting functionality for the servers 110, 111, 112 in the event that any one or more of the alert servers 110, 111, 112 can no longer provide alerting functionality.

Figure 2A:
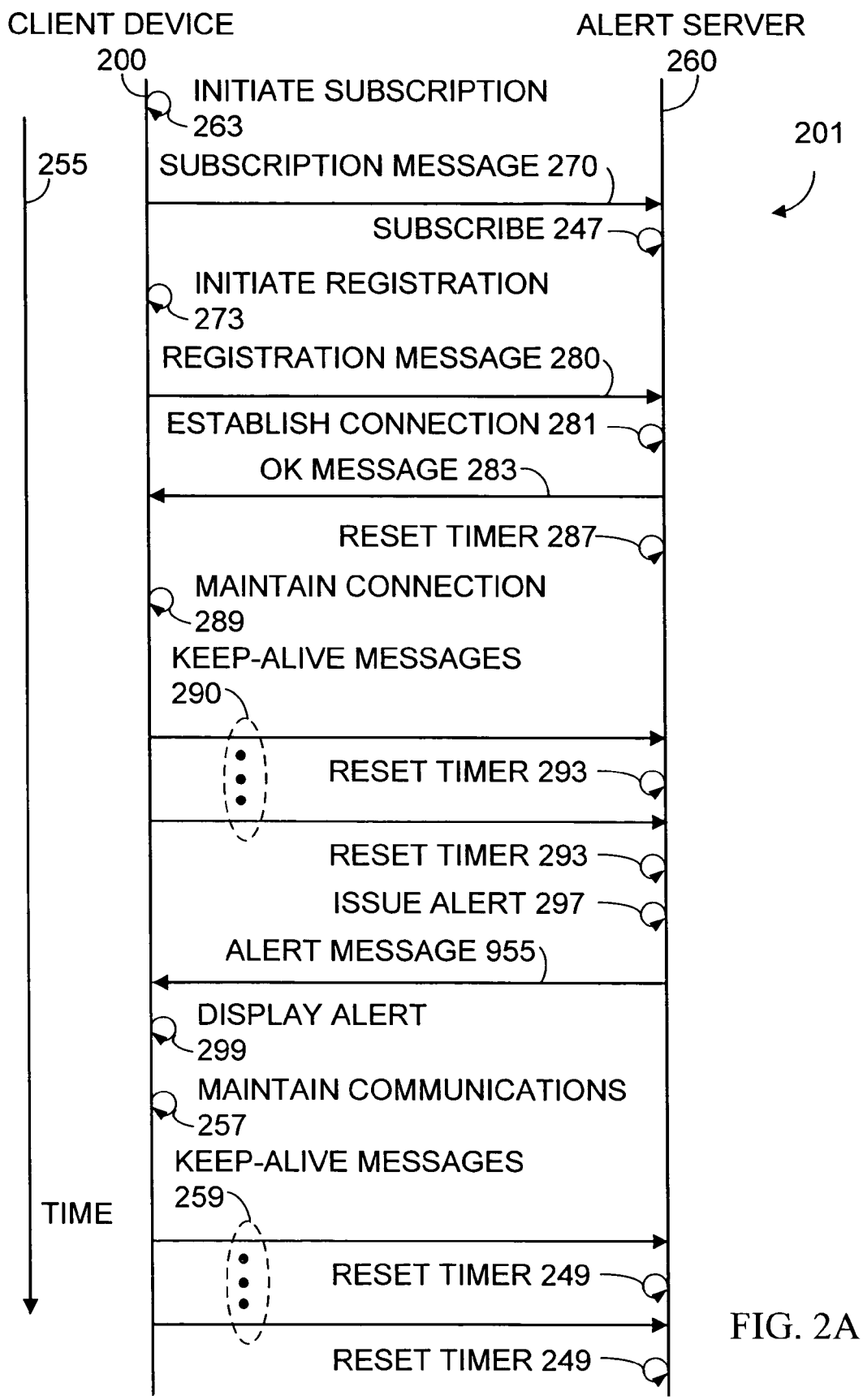
FIG. 2A is a messaging flow diagram illustrating the steps and messaging employed by an alert server and a client device in providing alerting functionality in the alert system of FIG. 1.

Further details on how a user can subscribe to receive alerts and subsequently receive alerts will now be described with reference to FIGS. 2A to 2F. In FIG. 2A, shown is a messaging flow diagram 201 illustrating the steps and messaging employed by an alert server 260 and a client device 200 in providing alerting functionality in the alerting system of FIG. 1. The alert server 260 and the client device 200 represent any suitable alert server and client device, respectively, within any one of geographic region 120, 121, 122 of FIG. 1. For example, alert server 260 and the client device 200 are shown as the alert server 110 and the PC 150, respectively, in geographic region 120. The steps in FIG. 2A involve communications between the client device 200 and the alert server 260. In FIG. 2A, an arrow 255 indicates a timeline. Furthermore, in the flow diagram 201, with the exception of the arrow 255 all straight arrows represent messages between the client device 200 and the alert server 260. Curved arrows indicate steps performed at the client device 200 and the alert server 260. The client device 200 initiates 263 a subscription process for subscribing with the alert server 260 to receive alerts in response to a user at client device 200 subscribing to receive alerts. The client device 200 initiates 263 the subscription process by sending a subscription message 270 containing subscription information to the alert server 260. Responsive to receiving the subscription message 270, the alert server 260 subscribes 247 the client device 200 for receiving alerts. The client device 200 also initiates 273 registration of the client device 200 with the alert server 260 to receive alerts by sending a registration message 280 to the alert server 260. The registration is initiated by the client device 200 each time a user logs-on to the client device 200 and when the client device 200 acquires access to the Internet. Responsive to receiving the registration message 280, the alert server establishes 281 a connection with the client device 200 by sending an OK message 283 and re-setting 287 a timer for the connection with the client device 200. The clients device 200 maintains 289 the connection with the alert server 260 by sending Keep-Alive messages 290 at periodic intervals of about 15 minutes, for example, to the alert server 260. Each Keep-Alive message 290 indicates to the alert server 260 that the connection with the client device 200 is to be maintained. Each time one of the Keep-Alive messages 290 is received, the alert server 260 re-sets 293 the timer to avoid a time out that would result in the connection being severed. The alert server issues 297 an alert in response to a request to issue the alert by sending an alert message 955 to the client device 200. Responsive to receiving the alert message 955, the client device 200 displays 299 the alert. The clients device 200 continues to maintain 257 the connection with the alert server 260 by sending Keep-Alive messages 259 at periodic intervals of about 15 minutes, for example, to the alert server 260. Each Keep-Alive message 259 indicates to the alert server 260 that the connection with the client device 200 is to be maintained. Each time one of the Keep-Alive messages 259 is received the alert server 260 resets 249 the timer to avoid a time out that would result in the connection being severed.

Figure 2B:
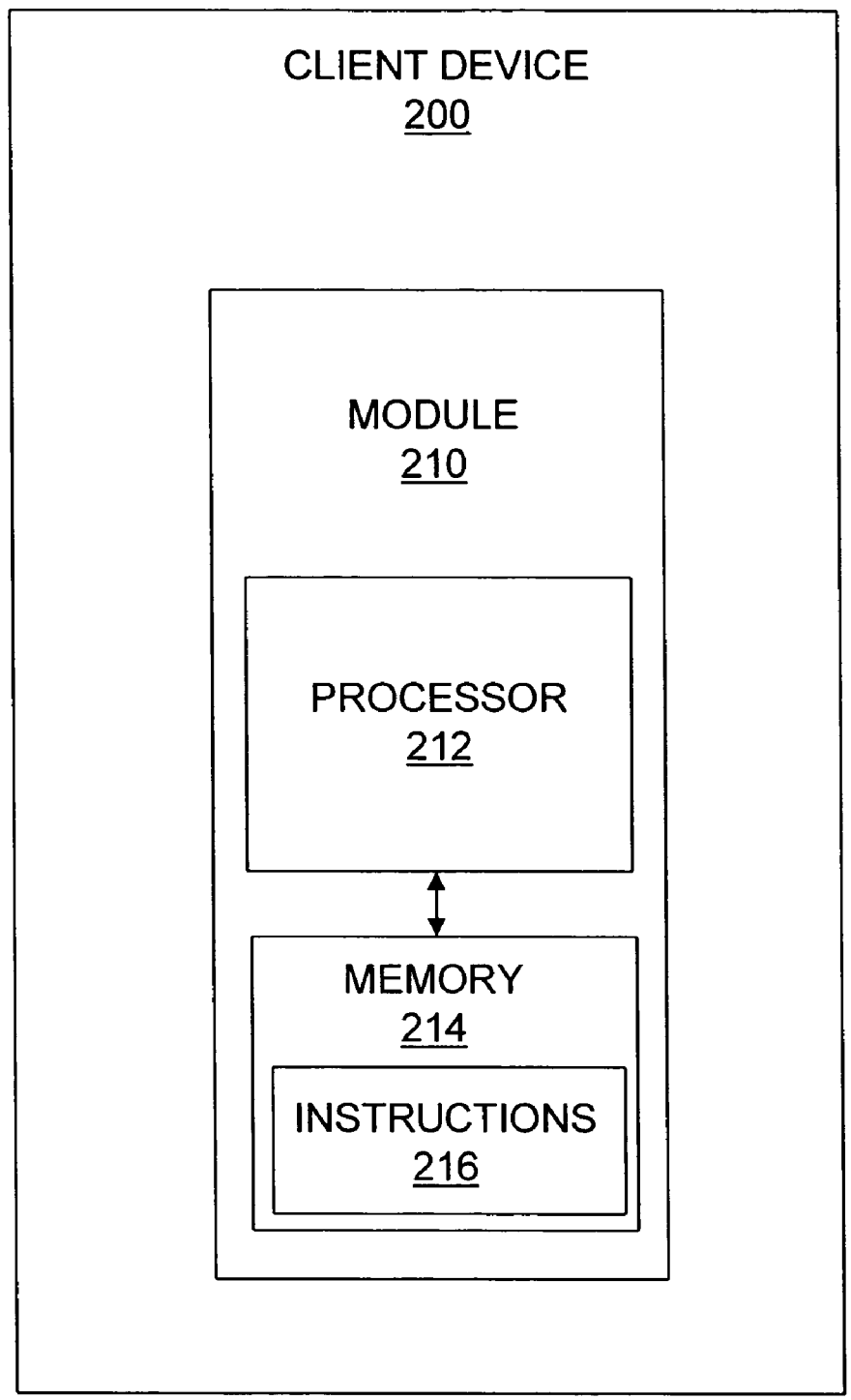
FIG. 2B is a block diagram of the client device of FIG. 2A.

Referring to FIG. 2B, shown is a block diagram of the client device 200 of FIG. 2A. The client device 200 has a module 210. The module 210 has processor 212 and a memory 214 having instructions 216 for providing alerting functionality. In particular, the module 210 allows users to subscribe and register with the alert server 260 and receive alerts from the alert server 260 of FIG. 2A. For new users, the module 210 is used to create new accounts during the subscription process. During account creation, the module 210 creates a user name and password for each user. The user name and password are used to securely access the alert server 260 of FIG. 2 to subscribe for receiving alerts.

Figure 2C:
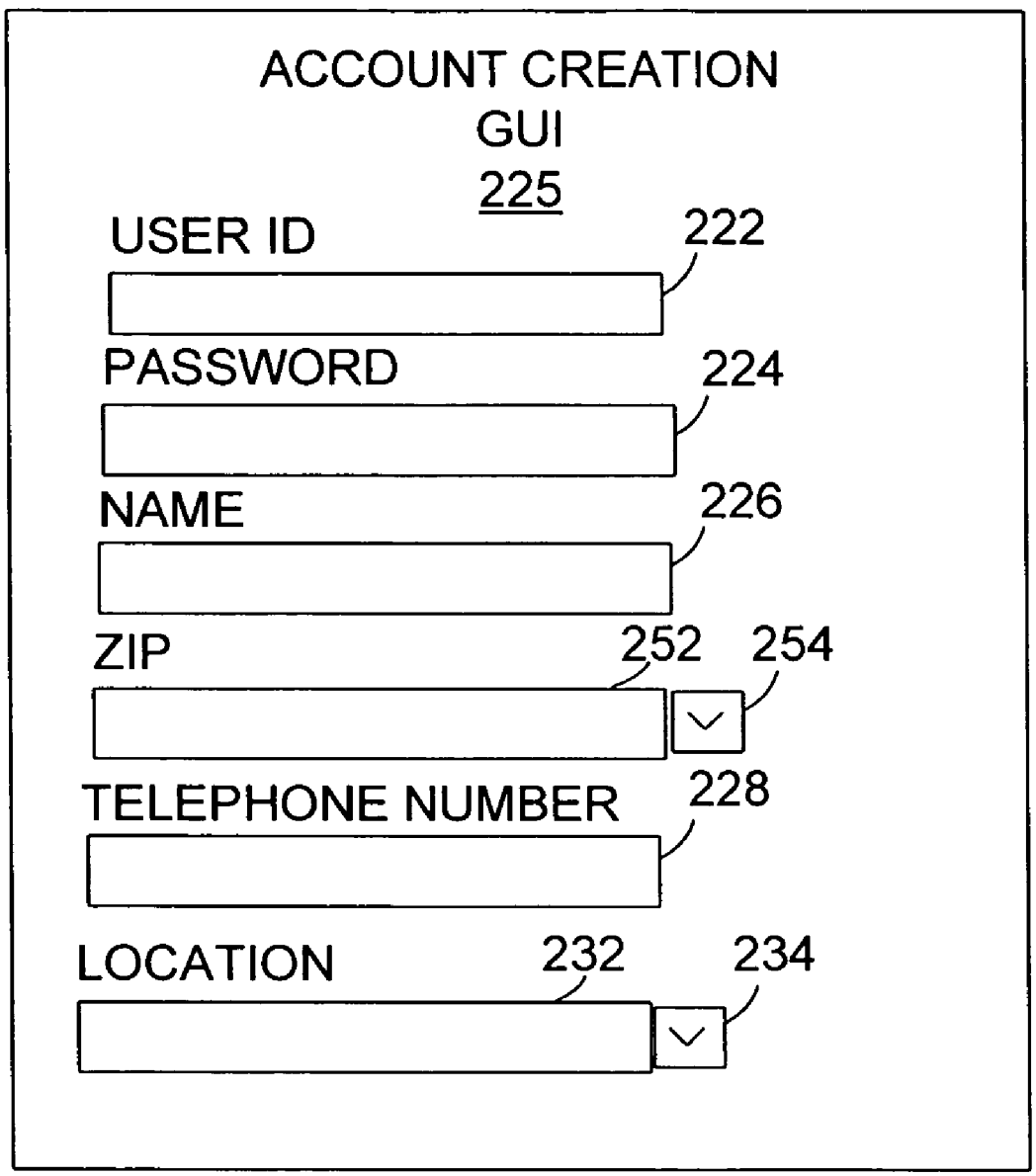
FIG. 2C is an exemplary account creation GUI (Graphical User Interface) for display at the client device of FIG. 2A during account creation.

Referring to FIG. 2C, shown is an exemplary account creation GUI (Graphical User Interface) 225 for display at the client device 200 of FIG. 2A during account creation. The account creation GUI 225 has boxes 222, 224, 226, 228, 232, 252 in which a user enters account information. The user registration GUI 225 also has buttons 234, 254 for providing drop-down menus for user selections. The boxes 222, 224 are used to allow a user to create a user name and password. The boxes 226, 252, 228 allow the user to provide other information such as a name, ZIP code or postal address, and telephone number, respectively. In some implementations, this information is optional in case the subscribers wish to protect their privacy, for example. The box 232 allows a user to specify the geographic location of the user. This information is used to determine which alert server is to provide alerting functionality to the subscriber. A list of locations is displayed when the button 234 is selected. In other embodiments of the invention, there is no location box 232, and a determination of which alert server is to provide alerting functionality for a subscriber is made by a central server (not shown in FIG. 2C).

Figure 2D:
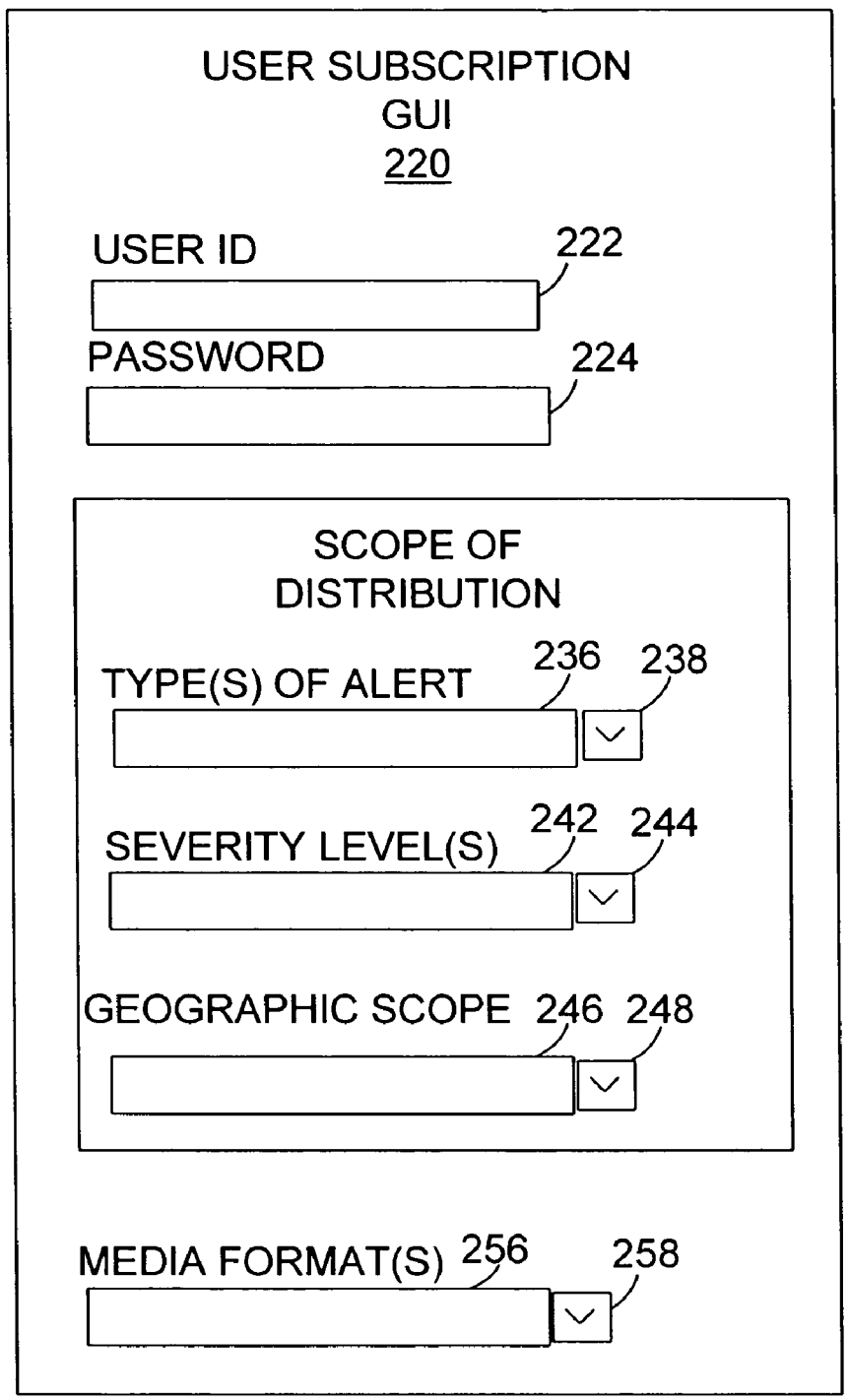
FIG. 2D is an exemplary user subscription GUI for display at the client device of FIG. 2A during subscription.

Referring to FIG. 2D shown, is an exemplary user subscription GUI 220 for display at the client device 200 of FIG. 2A during subscription. The user subscription GUI 220 has boxes 222, 224, 236, 242, 246, 256 in which a user enters subscription information. The user subscription GUI 220 also has buttons 238, 244, 248, 258 for providing drop-down menus for user selections. The box 256 allows a user to specify the type of media format(s) in which the alerts are to be sent. As will be discussed in detail below, a user selects one or more media formats such as text, voice, and video, for example. A list of media formats is displayed when the button 258 is selected.

In the implementation of FIG. 2D, a user subscribes to receive alerts within a specific scope of distribution. In this exemplary implementation there are three key categories used to specify the scope of distribution: 1) type of alerts to receive; 2) severity of alerts to receive; and 3) geographic scope. It is to be clearly understood, however, that any suitable number of categories can used. A user selects the type of alert the user is interested in receiving by entering the type or types of alerts in box 236, or by selecting button 238 and selecting a type or types of alerts from a drop-down menu. Example types of alerts include weather, security (police/army), and health (hospital/public health), for example. Regarding the severity of the alerts, each public alert has a level of severity associated with it, and users select which level(s) of severity of alerts they wish to receive using box 242 and/or button 244. In some implementations, the level of severity is based on a scale from 1 to 5, with Level 1 indicating the lowest severity and Level 5 indicating the highest severity. For example, a weather alert indicating 5 cm of snow may be Level 1 (low level of severity), while a weather alert indicating 40 cm of snow may be Level 4 (higher level of severity). Users also specify the geographic scope of interest for which they wish to receive alerts using box 246 and/or button 248. In some implementations, there are different levels of geographic scopes. Each geographic scope is identified using national, state-wide or provincial, municipal, and sub-municipal boundaries as well as latitude-longitude polygons, for example. For example, a user may be interested in receiving alerts in the New York area, and can select this option from a drop-down menu using button 248. In some implementations, selecting button 248 results in a map being displayed, and the user selects a geographic scope by clicking on the area of interest on the map.

Figure 2E:
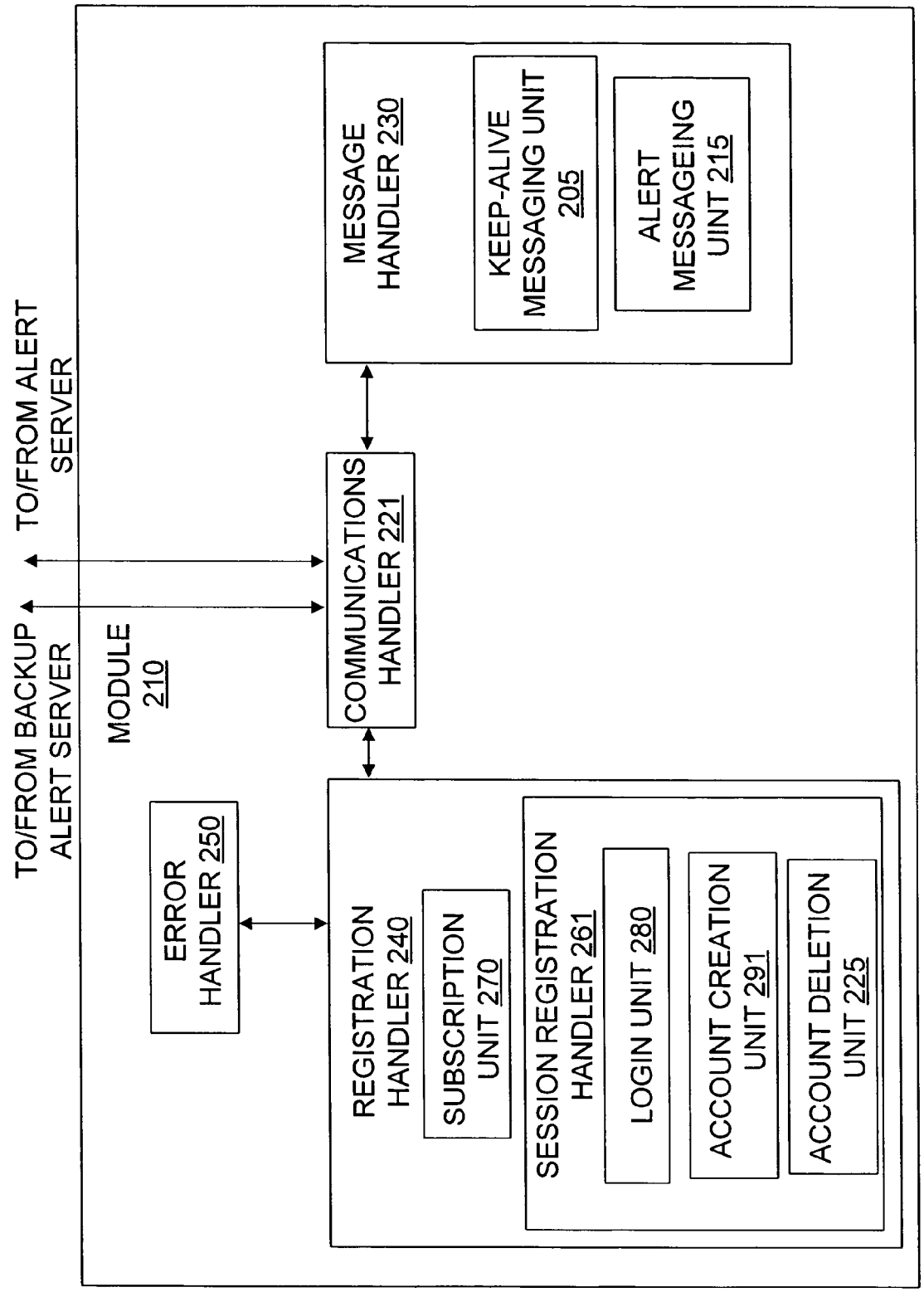
FIG. 2E is a functional block diagram of a module in the alert server of FIG. 2B.

Details of the functionality of the module 210 of the client device 200 of FIG. 2B will now be described with reference to FIG. 2E. The module 210 has a communications handler 221, a message handler 230, a registration handler 240, and an error handler 250. The registration handler 240 has a session registration handler 261 and a subscription unit 270. The session registration handler 261 has a login unit 280, an account creation unit 291, and an account deletion unit 225. The message handler 230 has a Keep-Alive messaging unit 205 and an alert messaging unit 215.

User accounts are created and subscriptions are made before subscribers receive alerts. The login unit 280 provides user login capability. The account creation unit 291 provides an interface for users to create accounts. The account deletion unit 225 provides an interface for users to delete accounts. The subscription unit 270 provides an interface for users to subscribe for receiving alerts. The registration handler 240 takes information from the account creation unit 291, the account deletion unit 225, and the subscription unit 270, and passes the information to the communications handler 220 to be sent to an alert server. Some of the user's account information is stored using the session registration unit 270 upon successful creation of an account with the alert server. The session registration handler 261 then uses this account information each time a session with the alert server is established.

Such a session is established with the alert server each time the client device boots up and connects to the Internet. Problems occurring during subscription or login are passed to the error handler 250, which subsequently takes a required action. Such an action might be to provide an error message or to provide an error message together with instructions to re-submit information, for example. In addition, responsive to receiving a message from a backup alert server indicating that the backup alert server is to provide alerting functionality, the session registration handler 261 registers with the backup alert server to establish a connection with the backup alert server and receive alert messages.

The Keep-Alive messaging unit 205 periodically sends Keep-Alive messages to the alert server by way of communications handler 221. The Keep-Alive messages are used to instruct the alert server to maintain communications with the client device 200. In some implementations, the Keep-Alive messages contain information on the number of alerts received and identifiers of the alerts received, for example. The alert server makes use of this information to determine whether the client device 200 has received all alerts. The alert messaging unit 215 provides alert messages when alerts are issued.

The communications handler 221 manages the flow of information between the client device 200 and the alert server 260 using socket communications, for example. The communication handler 221 has the responsibility of: 1) opening a TCP (Transmission Control Protocol) socket connection with the alert server during account creation and subscription processes, and closing the TCP socket connection after successful account creation, and subscription; 2) opening a TCP socket connection during session registration, and closing the TCP socket connection down after successful login and completion of subscription changes, if any; 3) opening a UDP (User Datagram Protocol) socket connection during session registration for sending Keep-Alive messages (in some implementations, this socket connection is also used to receive alert messages and to send other messages in the event of problems with any alert message); and 4) opening a TCP socket connection for user account deletion, and closing the TCP socket connection after a user account is deleted. In some cases, such as in the case of account creation for example, the connections need not be closed and are left open.

As discussed above, UDP socket connections are used during session registration and to send alerts. It is to be clearly understood that other types of connections such as TCP connections for example can be used. However, UDP can be used to provide faster and more efficient communications with subscribers. In particular, with the use of UDP socket connections a server can easily maintain thousands of connections with user devices for alerting. On the other hand, TCP has built-in mechanisms for reliable transport of data packets. However, as will be discussed in detail below, in some embodiments of the invention UDP is used in conjunction with a reliable mechanism for transport of data packets to provide an efficient and reliable transport mechanism.

Once user accounts are created and users have subscribed to receive alerts, they are ready to receive alerts issued by an issuer of alerts. In FIG. 2F, shown is an exemplary alert GUI 480 displayed at the client device 200 of FIG. 2A when an alert is issued. The alert GUI 480 has a date 482 at which the alert is received, an identification 484 of an issuer of the alert, an organization 486 to which the alert is intended to be sent, an identification 488 of a region to which the alert pertains, an identifier 490 of the type of alert, an identifier 492 of the level of severity of the alert, and a message 494 associated with the alert. The alert GUI 480 also has an OK button 496. A subscriber confirms receipt of the alert by clicking on the OK button 496.

Figure 3A:
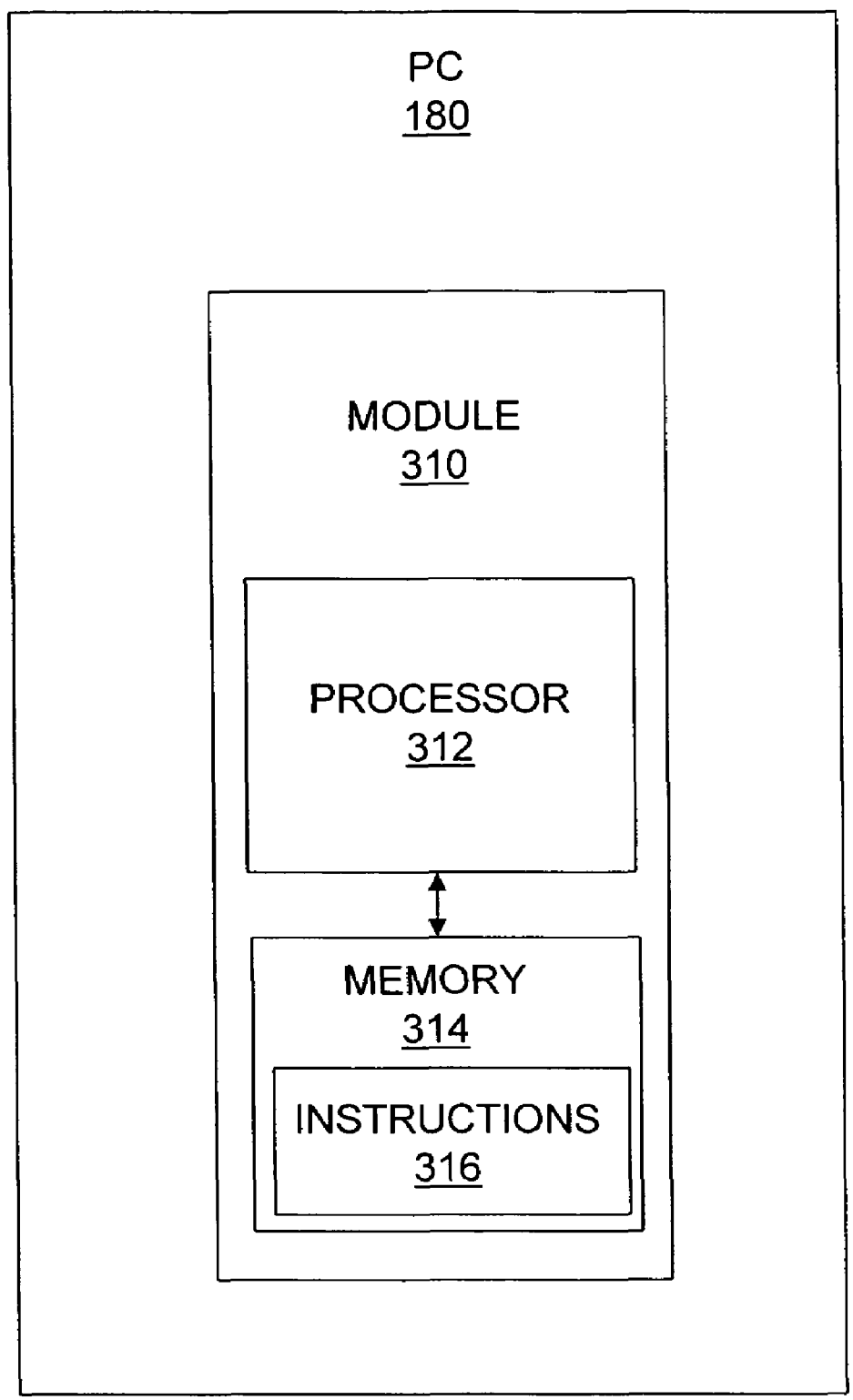
FIG. 3A is a block diagram of a PC (Personal Computer) in the alert system of FIG. 1 for use by an issuer of alerts in issuing alerts.
Figure 3B:
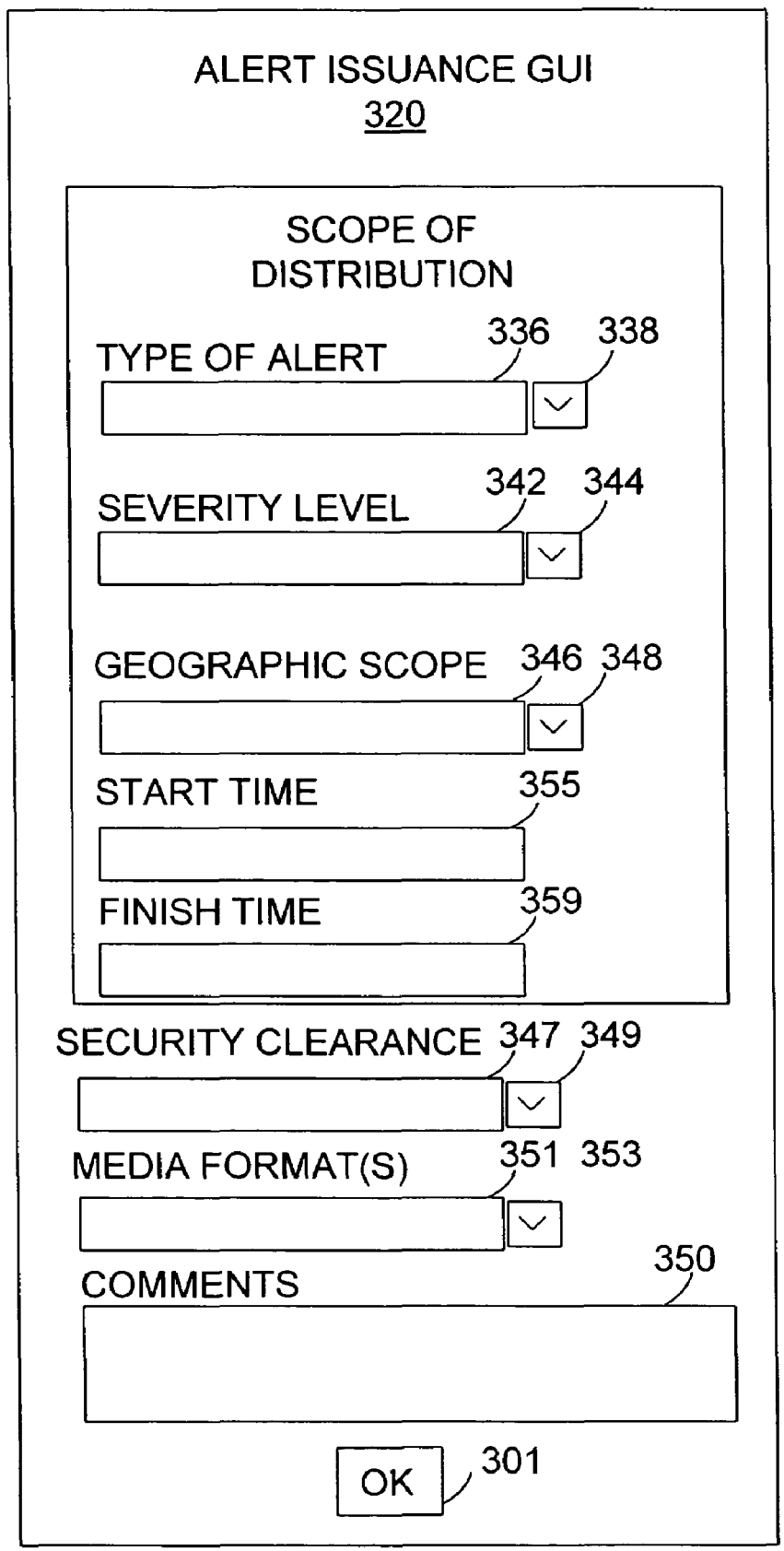
FIG. 3B is an alert issuance GUI used by the issuer of alerts at the PC of FIG. 3A.

In an exemplary context, the issuer of an alert is a public official with the responsibility of issuing warnings to the public whenever they occur. However, it is to be clearly understood that the issuer of an alert can be anyone who is given access to issue alerts. With reference to FIG. 3A, shown is a block diagram of the PC 180 in the alert system 100 of FIG. 1 for use by an issuer of alerts in issuing alerts. The PC 180 has a module 310 for issuing alerts. The module 310 has processor 312 and a memory 314 having instructions 316 for providing alerting functionality, which will now be described with reference to FIG. 3B.

To issue an alert an issuer logs-in using a user name and password. Upon successful login a GUI is displayed to allow the issuer enter information to issue the alert. An example of such a GUI is shown as alert issuance GUI 320 in FIG. 3B. The alert issuance GUI 320 has boxes 336, 342, 346, 347, 351, 355, 359 for specifying the type of alert, the severity level, the geographic scope, a security clearance level, the media format(s) for transmission, a start time for the alert, and a finish time for the alert, respectively. The alert issuance GUI 320 also has buttons 338, 344, 348, 349, 353 and OK button 301. Buttons 338, 344, 348, 349, 353 are used to provide drop-down menus of types of alerts, severity levels, geographic scopes, security clearance levels, and media formats available, respectively. The issuer selects a type of alert by entering information in box 336 or by clicking on button 338 to obtain a drop-down menu of types of alerts. The alert server also issues the alert only to subscribers that have subscribed to a particular level of severity or only to subscribers that have subscribed to the particular level of severity or higher. To do so the issuer selects a level of severity of the alert by entering information in box 342 or by clicking on button 344 to obtain a drop-down menu of levels of severity. The OK button 301 is selected to initiate a request to issue the alert.

In some instances the issuer may want to issue an alert only to subscribers that have a particular security clearance level or only to subscribers that have a particular security clearance level or higher. To specify a particular security clearance level the issuer enters the security clearance level(s) in box 347 or clicks on button 349 to obtain a drop-down menu of security clearance levels. For example, in some implementations there are four proposed security clearance levels including: 1) basic; 2) enhanced; 3) high; and 4) highest. In this example, users are assigned the basic level by default, and a public official could be given any one of the other higher security clearance levels. For example, heads of departments in a particular city or law-enforcement officials could be given a high security clearance level. Furthermore, in some implementations, the subscribers are also given a security clearance level. This allows the issuer of an alert to notify particular sets of subscribers based on their security clearance level.

The geographic scope depends on the alert being issued and may require city-wide distribution, state or province wide distribution, or nation wide distribution, for example. The issuer selects the geographic scope of the alert by entering a location or area. Alternatively, the issuer selects button 348 to obtain a drop-down menu of locations and areas or to obtain a map for user selection of a location or area. The issuer of an alert also enters one or more media types for transmission of the alert by entering the media format or formats in box 351. Alternatively, the issuer selects button 353 to obtain a drop-down menu of media formats and selects one or more formats. Example media formats include text, video, and audio, for example. The alert issuance GUI 320 also has a comments box 350 for allowing the issuer to provide comments in an alert message.

With reference to FIG. 1, as discussed above, once an alert is sent to the alert server 110, the alert server 110 notifies the other alert servers 111, 112 and sends the alert to the PC 150. A detailed description of the alerting functionality of alert servers will now be described with reference to FIGS. 4A and 4B.

Figure 4A:
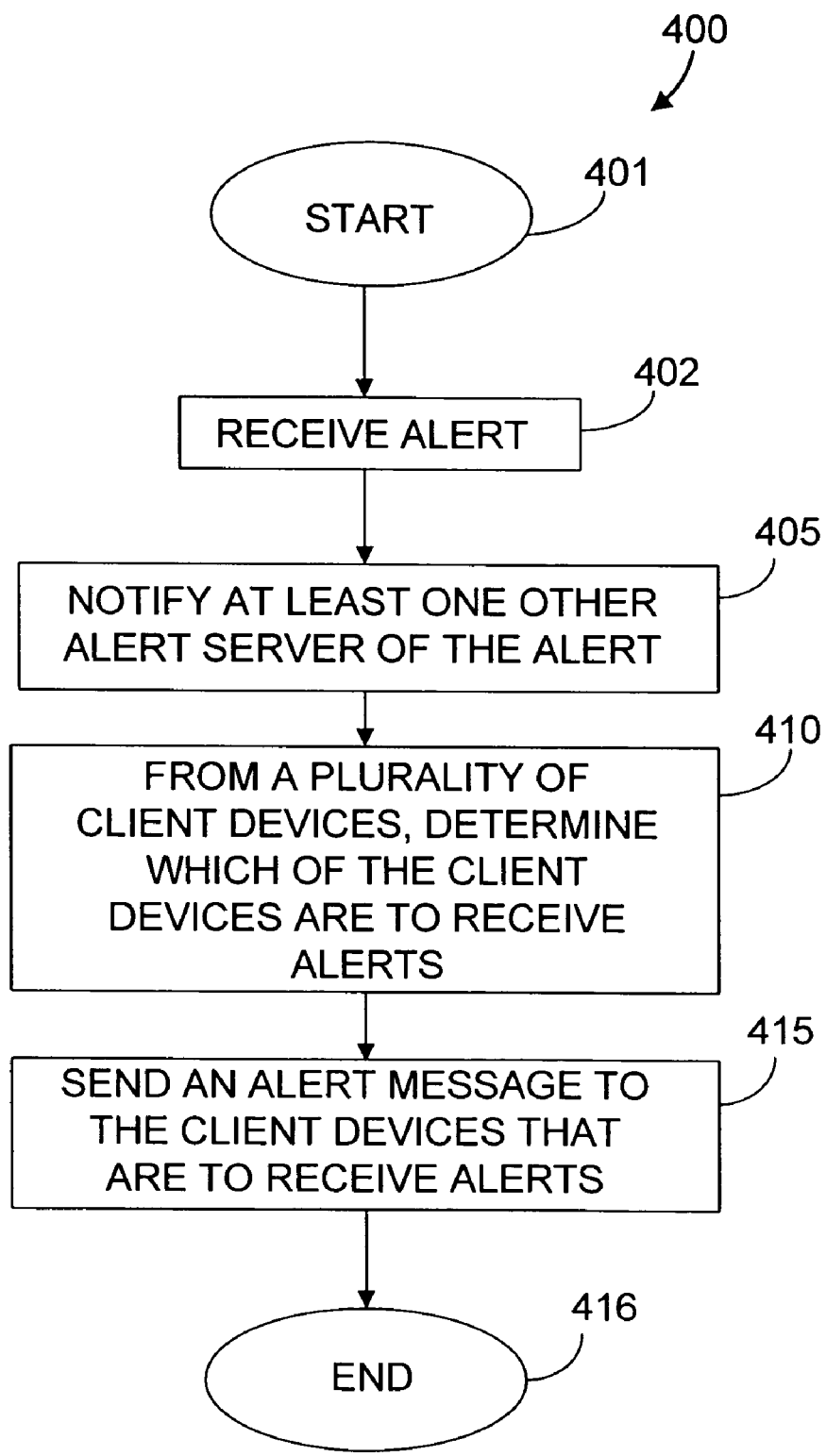
FIG. 4A is a flow chart of a method of alerting implemented by an alert server in the alert system of FIG. 1.

Referring to FIG. 4A, shown is a flow chart of a method 400 of alerting implemented by an alert server of FIG. 1. The method is employed by any one of alert servers 110, 111, 112 of FIG. 1, for example. Upon start 401, at step 402 instructions to issue an alert are received at an alert server. At step 405 at least one other server is notified of the alert. By notifying other servers of the alert the other servers can participate in disseminating the alert. At step 410 a determination is made as to which client devices (subscribers) are to receive alerts. At step 415 an alert message is sent to the client devices (subscribers) that are to receive alerts before end 416. This method is applied to the system 100 of FIG. 1 where the alert server 110 receives an alert from PC 180. The alert server 110 notifies alert servers 111, 112 of the alert. The alert server 110 also determines which client devices are to receive the alert in geographic region 120. In the example of FIG. 1, the PC 150 is to receive the alert from server 110. The alert server 110 then sends an alert message to PC 150.

By having the alert server 110 notify alert servers 111, 112 of the alert, the alert servers 111, 112 also participate in the alerting process by alerting client devices in their respective geographic regions 121, 122. This type of alert system allows additional servers to be added to the system 100 with each alert server providing alerting services within a respective region, thereby providing scalability to the system 100. Furthermore, if the number of subscribers within a region increases to the point where there are too many subscribers for one alert server to handle, one or more alert servers are added to provide alerting services in that region. This is done for example by dividing the region into sub-regions and assigning an alert server to each sub-region. There are several possible ways in which a region can be assigned to an alert server. For example, in some implementations a single server provides alerting functionality for all subscribers within a state or municipality depending on the number of subscribers in the state or municipality. Embodiments of the invention are not limited to assigning a geographic area to each alert server for providing alerting functionality. For example, in other embodiments of the invention when a new alert server is added to an alert system, the new alert server provides alerting functionality for any new subscribers until the alert server has reached a maximum number of subscribers. When the maximum number of subscribers has been reached another alert server is again added to the system and provides alerting functionality for new subscribers regardless of their geographic location.

Figure 4B:
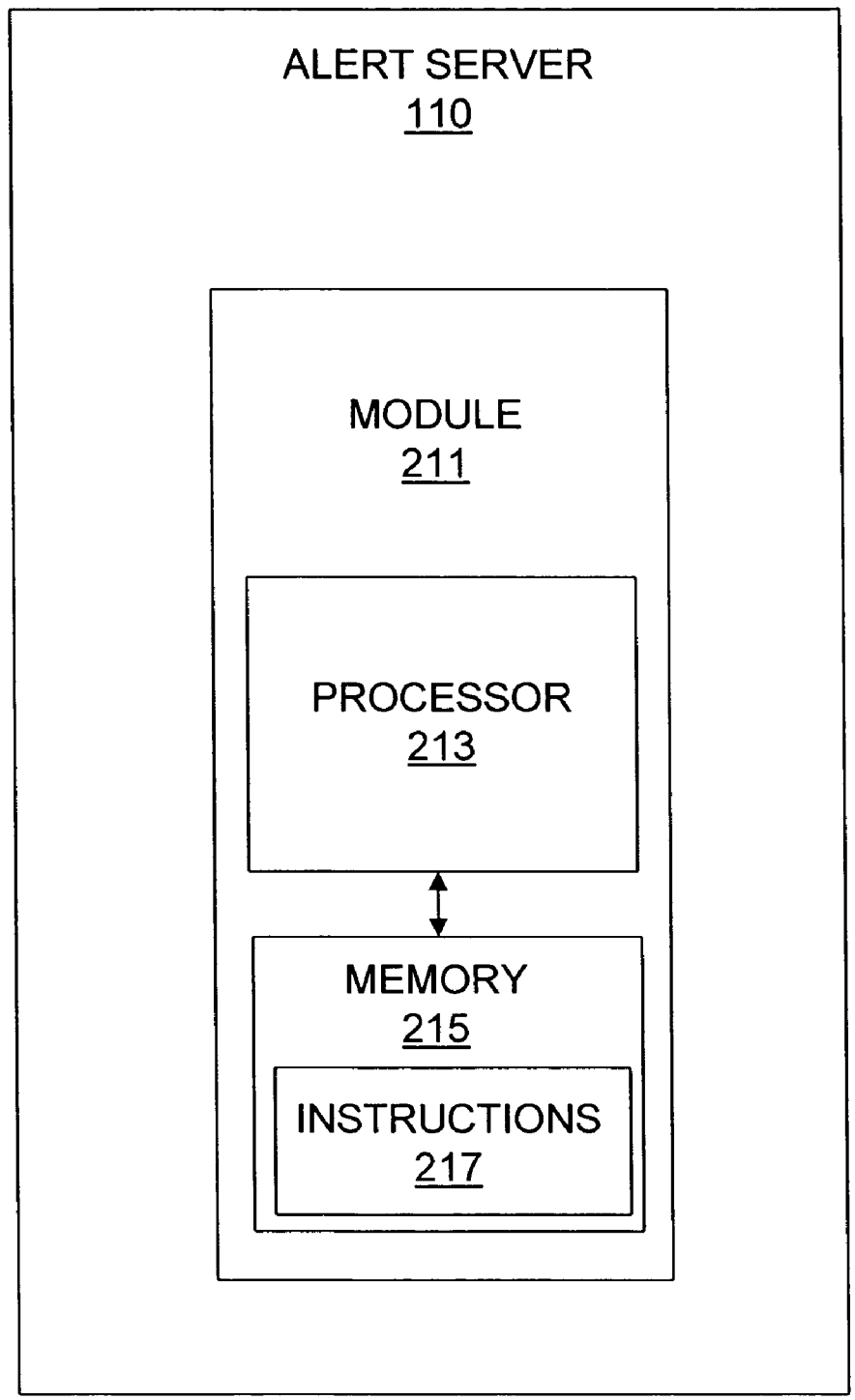
FIG. 4B is a block diagram of an alert server in the alert system of FIG. 1.
Figure 4C:
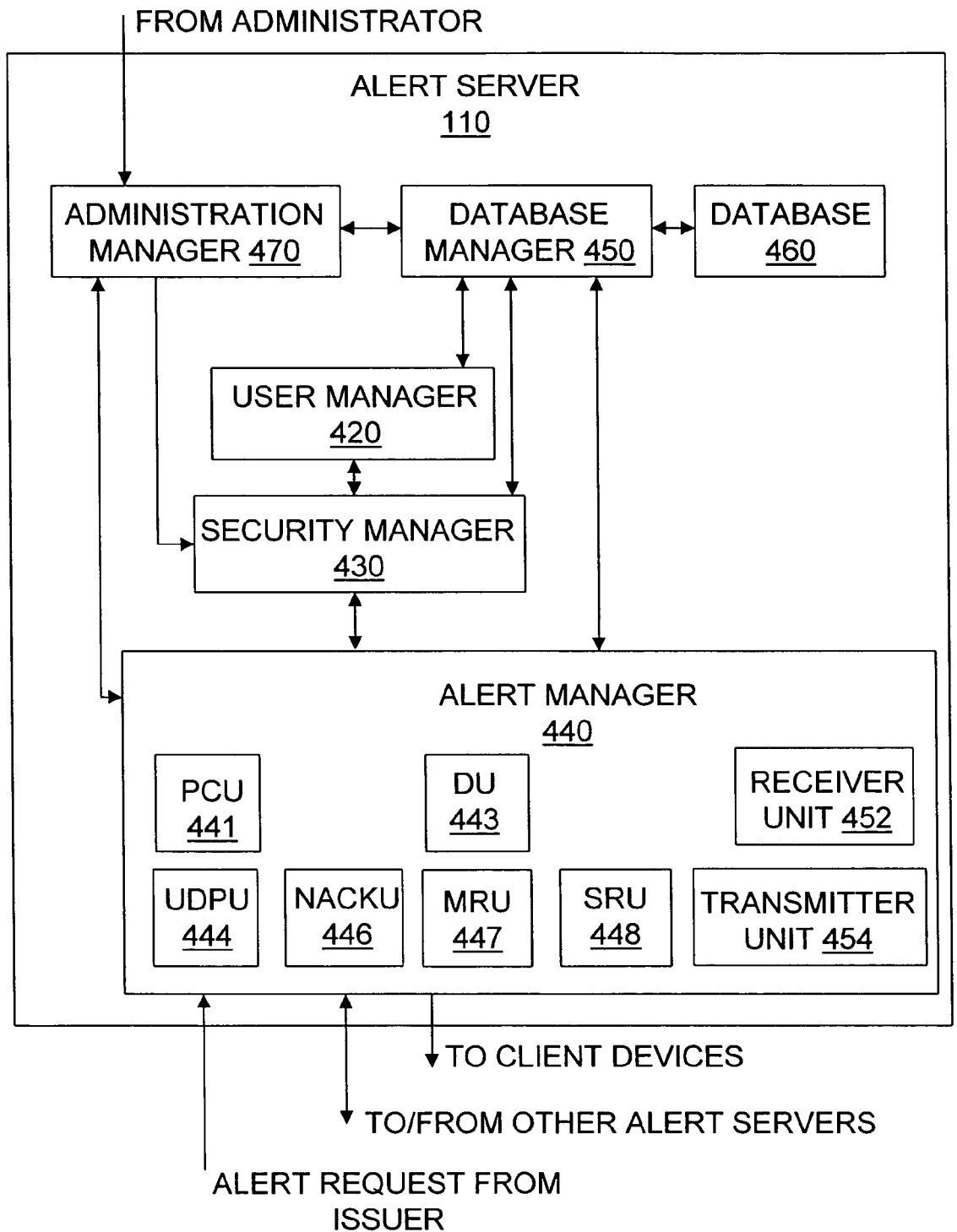
FIG. 4C is a functional block diagram of an alert server in the alert system of FIG. 1.

Further details of the functionality of the alert servers 110, 111, 112 of FIG. 1 will now be described with reference to FIGS. 4B and 4C. In FIG. 4B, shown is a block diagram of the alert server 110 in the alert system 100 of FIG. 1. Although the block diagram of FIG. 4B will be used to describe the functionality of the alert server 110, it is to be clearly understood that the block diagram is also applicable to alert servers 111, 112. The alert server 110 has a module 211. The module 211 has processor 213 and a memory 215 having instructions 217 for providing alerting functionality. In FIG. 4C, shown is a functional block diagram of the alert server 110 in the alert system 100 of FIG. 1. Although the functional block diagram of FIG. 4C will be used to describe the functionality of the alert server 110, it is to be clearly understood that the functional block diagram is also applicable to alert servers 111, 112. The alert server 110 has a user manager 420, a security manager 430, an alert manager 440, an administration manager 470, a database manager 450, and a data base 460. The alert manager 440 has a PCU (Peer Communications Unit) 441, a DU (Distribution Unit) 443, a UDPU (User Datagram Protocol Unit) 444, a NACKU (Negative ACKnowledgement Unit) 446, a MRU (Messaging Reliability Unit) 447, a SRU (Statistics Reporting Unit) 448, a receiver unit 452, and a transmitter unit 454.

The security manager 430 is used to authenticate users and provide authorizations to the users for connecting with the alert server 110. The security manager 430 loads user information using the database manager 450 when a password supplied by a user matches the password stored in the database 460 for that user. This prevents intruders from sending false alerts to subscribers and prevents intruders from accessing and/or changing subscriber information. Furthermore, the security manager 430 provides information on issuers of alerts to the alert manager 440 for determining whether an issuer requesting that an alert be issued has the requisite security clearance level to issue the alert. For example, an official in Los Angeles may not have the security clearance level to issue alerts to subscribers in New York. At the same time, one may want to allow a state official in Nebraska to be able to issue alerts to subscribers in every municipality within that state. This is achieved by maintaining in database 460 security access lists containing information on security clearance information for each issuer of alerts. In an example implementation, each listing in a security access list contains: 1) the names of the issuers of alerts; 2) user names; 3) passwords; 4) the security clearance levels of the issuers; 5) maximum geographic scopes over which each issuer can issue alerts; and 6) maximum levels of severity with which the issuers can tag alerts. This security access list is created and maintained by the administration manager 470 based on information input by an administrator.

The user manager 420 creates accounts upon user requests and allows subscribers to subscribe and register to receive alerts. The user manager 420 also tracks client devices that have been authenticated, registered, and are connected to the system. The alert manager 440 receives requests for issuing alerts from issuers of alerts. The security manager 430 ensures the validity of the requests before any alerts are issued to subscribers by validating a user name and password received from the issuer. Once an alert request is deemed valid, the alert manager 440 notifies other alert servers of the alert. The DU 443 is used by the alert manager 440 to determine which of its subscribers are to receive the alert and sends them the alert. As will be discussed in detail below, in some implementations the DU 443 employs a hierarchical model to determine which subscribers are to receive an issued alert based on the scope of distribution to which the subscriber has subscribed. The SRU 448 tracks the delivery of alerts, and information on the delivery of alerts is stored in the database 460 for reporting. Information on subscribers, issuers, and server configurations is also stored in the database 460, and the database manager 450 provides an interface between the database 460 and the user manager 420, the security manager 430, and the alert manager 440.

With reference to FIGS. 1 and 4C, as discussed above, the alert servers 110, 111, 112 communicate with each other to provide alerting functionality. The PCU 441 maintains a list of active alert servers 110, 111, 112 and distributes the list of active alert servers to the alert servers 111, 112. Responsive to receiving a registration request from a new alert server to register as an alert server, the PCU 441 updates the list of active alert servers to include the new alert server. The alert server 110 serves as a central alert server and distributes work load among alert servers. In some implementations, the administration manager 470 assigns respective subscribers to each alert server in the alert system. In other implementations, the administration manager 470 assigns to each alert server a geographic region over which to provide alerting functionality.

The UDPU 444 sends alert messages using a UDP-based protocol. The NACKU 446 provides a negative acknowledgement mechanism. In response to receiving a NACK message from a client device, such as PC 150, indicating that one or more data packets from an alert message have not been received, the NACKU 446 sends the alert message to the client device. The MRU 447 provides additional reliability in sending alerts. In particular, the PC 150 sends information on alerts that have been received. Responsive to receiving a message containing alert information from the PC 150, the MRU 447 determines whether the PC 150 has received the alert message using the alert information, and if the PC 150 has not received the alert message, re-sends the alert message to the PC 150. Furthermore, responsive to receiving from the PC 150 a registration request to establish a connection for receiving alerts, the MRU 447 determines whether the PC 150 has received the alert message, and if the PC 150 has not received the alert message, sends the alert message to the PC 150. In some embodiments of the invention, the functionality of the MRU 447 is implemented at the PC 150. In such embodiments, responsive to receiving a message containing alert information from the alert server 110, the PC 150 determines whether it has received the alert message using the alert information. If the alert message has not been received the PC 150 notifies the alert server 110. Advantageously, shifting the MRU's 447 functionality to the PC 150 reduces the load on the alert server 110 thereby providing additional scalability in the alert system. The SRU 448 maintains statistical information on alerts. Additional details on the functionality of the PCU 441, the DU 443, the UDPU 444, the NACKU 446, the MRU 447, and the SRU 448 will be given below.

It is to be clearly understood that embodiments of the invention are not limited to the alert server 110 having the above alerting functionality. For example, in some implementations the alert manager 440 has none or more of the DU 443, the UDPU 444, the NACKU 446, the MRU 447, and the SRU 448.

An administrator accesses the alert server 110 of FIG. 4C using a web browser, for example, to undertake administration duties. The administration manager 470 provides an interface for the administrator to manage accounts of subscribers and issuers of alerts. The web based approach allows remote support of the alert server 110, including the ability to remotely monitor, configure, and administer the alert system 100 in a secure manner. The administration manager 470 also communicates with the alert manager 440 to obtain statistical information including: 1) the number of configured subscribers for each type of alert; 2) current and/or peak number of subscribers connected to the system 100; 3) system resources being used such as memory and bandwidth; and 4) error logs, for example. In some implementations, the statistical information includes reports on the quality and reliability of issued alerts. For example, in some implementations a report includes any one or more of the following: 1) the number of alerts that were sent by an issuer of alerts; 2) the number of subscribers that did not receive sent alerts because their client device was not available; and 3) a listing of the subscribers that did not receive sent alerts.

Figure 4D:
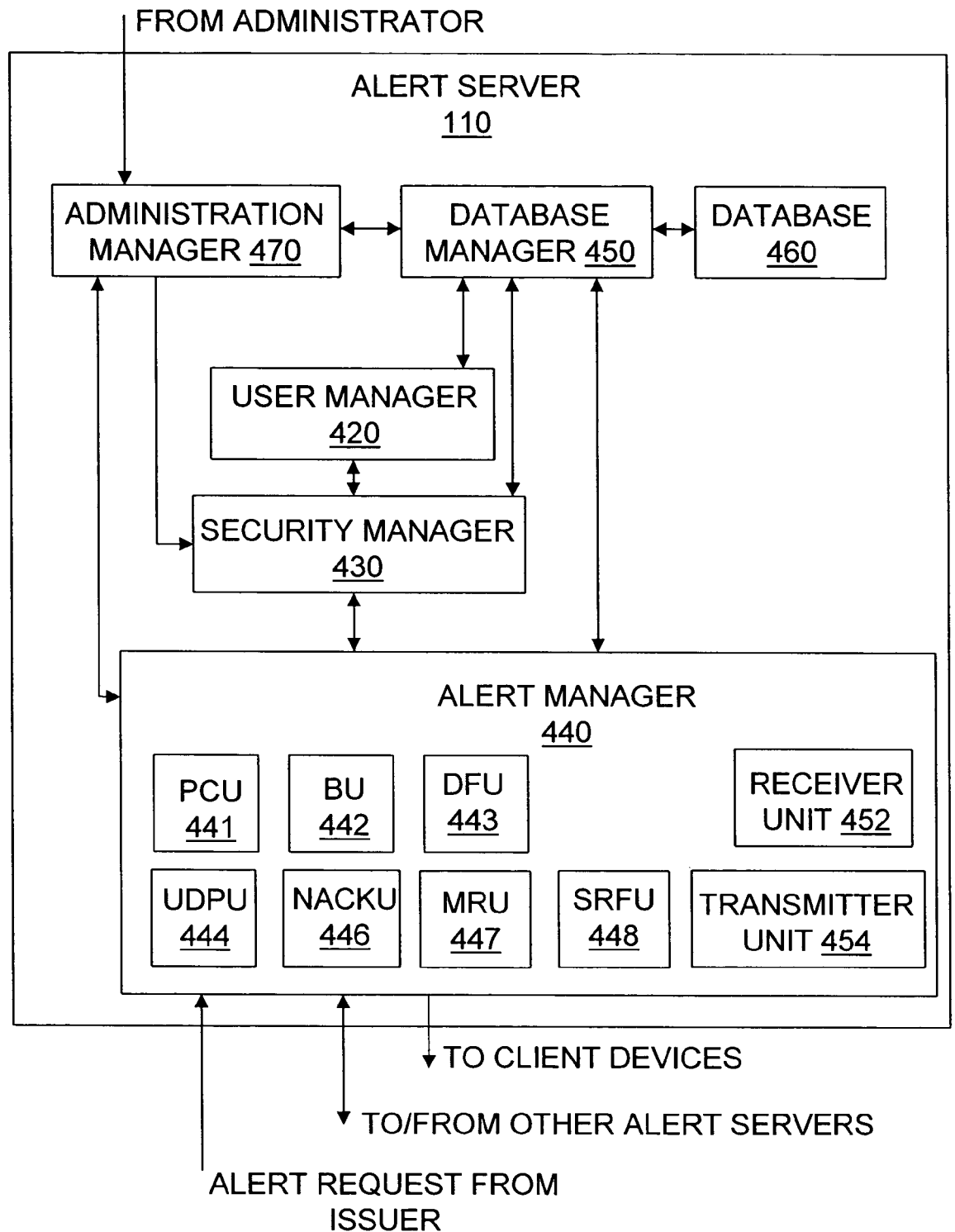
FIG. 4D is a functional block diagram of a backup alert server in the alert system of FIG. 1.

Referring to FIG. 4D, shown is a functional block diagram of the backup alert server 140 of the alert system 100 of FIG. 1. Although the functional block diagram of FIG. 1 will be used to describe the functionality of the backup alert server 140, it is to be clearly understood that the functional block diagram is also applicable to backup alert servers 141, 142. The backup alert server 140 is similar to the backup alert server 110 of FIG. 4C with the addition that the alert manager 440 has a BU (Backup Unit) 442. The backup unit 442 is used to provide backup alerting functionality for the alert server 110 in the event that the alert server 110 can not provide alerting functionality. More generally, the backup unit 442 is used to provide backup alerting functionality for one or more alert servers. Additional details on the functionality of the backup unit 442 will be given below.

With reference to FIG. 1, as discussed above the servers 110, 111, 112 communicate with each other to collectively provide alerting functionality.

To communicate with each other each alert server 110, 111, 112 uses a list containing information on the alert servers 110, 111, 112. In some implementations, one of the alert servers 110, 111, 112, such as alert server 110 for example, is designated as a central server, and maintains a list of all active alert servers on the system 100. The list contains addresses of the active servers 110, 111, 112 and other information on the servers, such as information the geographic scope of the region they cover for example. In FIG. 5, shown is an example list 500 maintained by alert servers 110, 111, 112 in the alert system 100 of FIG. 1. The list 500 has columns 510, 520, 530. Column 510 identifies the active alert servers using a server ID (IDentifier). Column 520 provides an IP address for each active alert server, and column 530 identifies a geographic region covered by each alert server. For example, the server with server ID 2 has IP address 168.192.1.2, and provides alerting functionality for Seattle. The central alert server, which is one of alert servers 1, 2, and 3, periodically distributes the list 500 to the other active alert servers. The interval of time (1 hour for example) at which the list 500 is distributed is selected to be short enough to allow changes in the alert system 100 to be updated without too much delay and at the same time avoid unnecessary traffic on the Internet. With reference to FIGS. 1 and 5, in an exemplary implementation the alert servers with server IDs 1, 2, 3 correspond to alert servers 110, 111, 112, respectively. The alert server 110 with server ID 1 is designated as the central alert server. A peer discovery and registration process is implemented to allow new alert servers to be added to the system 100. When a new alert server is added, it registers with the central server with server ID 1 (alert server 110) by providing registration information. The registration information includes an address of the new alert server and other information on the new alert server, such as the geographic region covered by the new alert server. In other implementations, it is the central alert server that determines the region that is to be covered by the new alert server. The central alert server (alert server 110) updates the list 500 and periodically distributes the list 500 to the other alert servers 111, 112.

The above method of maintaining a list of active alert servers relies on one of the alert servers 110, 111, 112 being designated as a central alert server. If alert servers lose their connections with the central alert server, a new alert server is designated as the central alert server. One method of determining which alert server is to be designated as the central alert server relies on the order in which the alert servers are listed in the list 500. For example, in the list 500, alert server 1 is the first alert server listed in the list 500, and therefore this alert server is designated as the central alert server. In the event that communications can no longer be established with alert server 1 the next alert server in the list 500, which is alert server 2 in this case, is designated as the new central alert server. If communications with alert server 1 is lost, alert server 2 updates the list 500 and distributes it to alert server 3.

In some implementations, when an alert server receives instructions to issue an alert, the new alert server communicates with the central alert server to obtain the most current list of active alert servers to determine which alert servers are to receive notification of issued alerts. In some of these implementations, if the alert server receiving the instructions to issue an alert cannot establish communications with the central server, it relies on its list stored locally to determine which server(s) need notification.

As discussed above, alerts are issued to subscribers based on the type of alert, the level of severity, and the geographic scope. In some embodiments of the invention, a hierarchical model which is based on levels of severity and/or geographic scopes is used to determine which of the subscribers are to receive issued alerts. In an example implementation there are five levels of severity, Level 1 to Level 5, with Level 1 having the lowest level of severity, and Level 5 having the highest level of severity. In this example hierarchical model a subscriber who subscribes to receive a alerts of a particular level of severity receives alerts having that particular level of severity or higher. Table I lists the alerts to be received for various levels of severity to which a subscriber can subscribe.

TABLE I

List of available levels of severity according to a hierarchical model.

| Alert Severity Level Subscribed to by User | Alert Severity Levels for which User will Receive Alerts |
| --- | --- |
| 5 | 5 |
| 4 | 4, 5 |
| 3 | 3, 4, 5 |
| 2 | 2, 3, 4, 5 |
| 1 | 1, 2, 3, 4, 5 |

For example, a user who subscribes to receive alerts having a Level 3 level of severity will receive alerts having levels of severity of 3, 4, and 5. Furthermore, a user who subscribes to receive alerts having a Level 5 level of severity will only receive alerts having a Level 5 level of severity.

As discussed above the issuer also has the capability of selecting the geographic scope over which an alert is to be disseminated. In this example, the geographic scopes include national, state or provincial, municipal, and sub-municipal levels. Furthermore, subscribers select the geographic scope for which they wish to receive alerts. In the example hierarchical model a subscriber who subscribes to a particular geographic scope will receive alerts disseminated for that particular geographic scope and alerts disseminated to cover a larger geographic scope that covers the particular geographic scope selected by the subscriber. Table II lists the alerts to be received for various subscriber selections of geographic scopes.

TABLE II

Listing of geographic scopes of alerts.

| Geographic Scope Selected by Subscriber | Geographic Scope of Alert Issued | | | |
| --- | --- | --- | --- | --- |
| | National | State/Provincial | Municipal | Sub-Municipal |
| National | ✓ | X | X | X |
| State/Provincial | ✓ | ✓ | X | X |
| Municipal | ✓ | ✓ | ✓ | X |
| Sub-Municipal | ✓ | ✓ | ✓ | ✓ |

For each geographic scope available for selection by a subscriber Table II identifies the alerts received by the subscriber. In Table II a "✓" indicates that alerts issued with a particular geographic scope are sent to the subscriber, and an "X" indicates that alerts issued with the particular geographic scope are not sent to the subscriber. For example, a subscriber who subscribes to receive alerts at the municipal level receives alert issued at the municipal, state or provincial, and national levels but does not receive alerts issued at the sub-municipal level. Furthermore, in this hierarchical model an alert of National scope sent by an issuer will be received by users regardless of the geographic scope for which they have subscribed. In other implementations, the model provides a mechanism to allow a subscriber to specify one or more geographic scopes and the subscriber only receives alerts issued within the selected scope or scopes.

As discussed above, in some embodiments of the invention an alerting system also provides voice and video alert distribution over the Internet. For example, with reference to FIG. 1 in some implementations the PC 180 has a webcam and a microphone (not shown in FIG. 1) for recording a voice and video message to be sent as part of an alert. The PC 180 then issues the alert to the alert server 110 by sending the recorded voice and video data to the alert server 110. The alert server 110 then notifies the alert servers 111, 112 of the alert by sending the recorded voice and video data. The alert server 110 also sends the voice and video data to the PC 150 to alert a subscriber in region 120. More generally, alerts are distributed in any suitable format such as text, video, and voice to any suitable client device capable of receiving text, video or voice data. Such client devices include PCs, cell phones, and PDAs for example. In some implementations, alerts recorded on video are distributed to TV (TeleVision) stations and/or to Internet users having any suitable devices with video capability. In some implementations, alerts recorded using voice are distributed to any one or more of radio stations, TV Stations, and to Internet users having any suitable client devices with audio capability.

Figure 6:
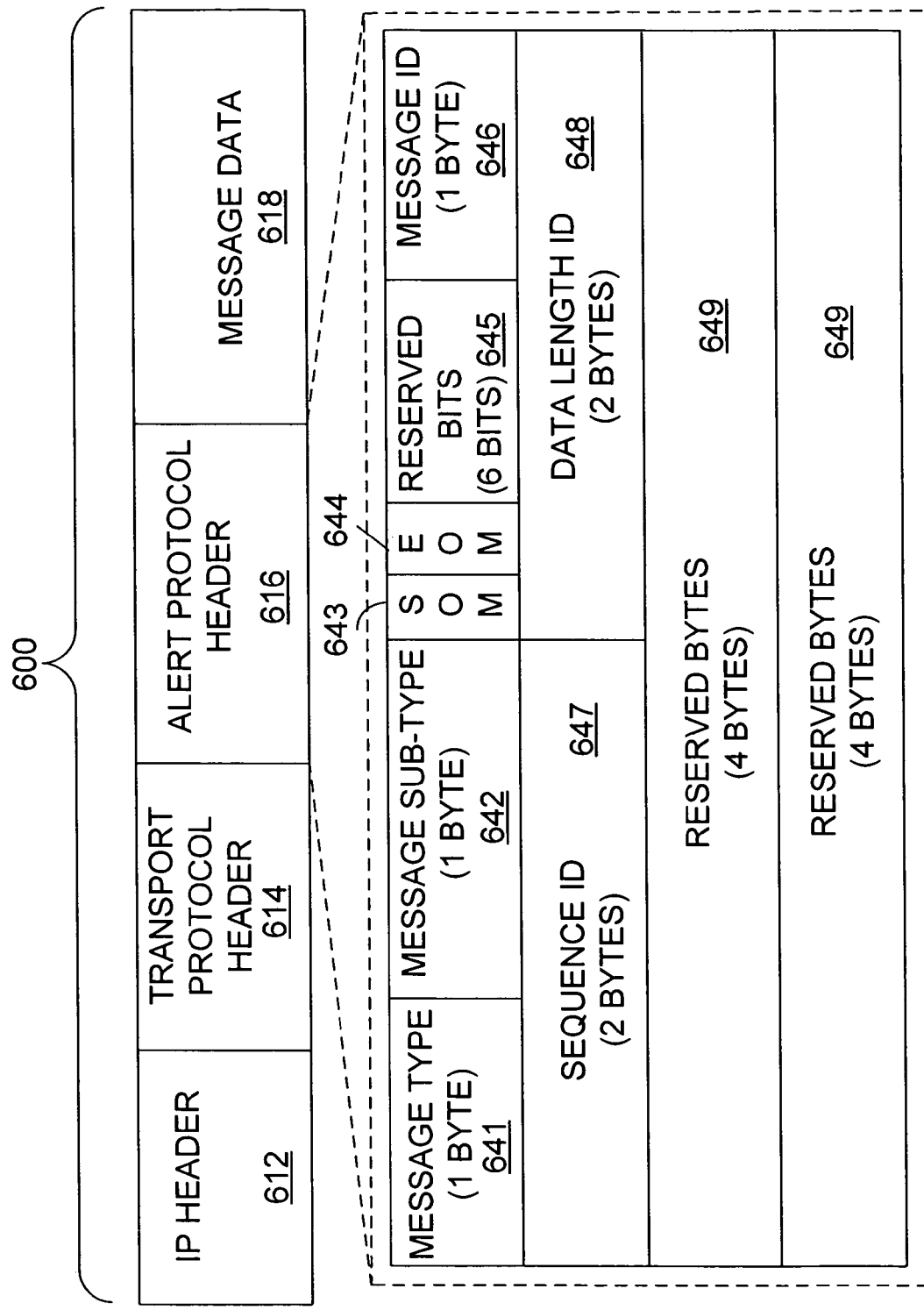
FIG. 6 is a data packet used for communications in the alert system of FIG. 1.

As discussed above, any suitable transport protocol can be used for communications between client devices and alert servers as well as between alert servers. However, further details on how to provide a system that maintains a high level of security and reliability while efficiently making use of bandwidth will now be given. To begin, an exemplary messaging format used for communications will now be described with reference to FIG. 6. In FIG. 6, shown is a data packet 600 used for communications in the alert system 100 of FIG. 1. The data packet 600 has an IP header 612, a transport protocol header 614 for identifying the protocol over which the data packet 600 is being transported, an alert header 616, and message data 618. The alert header 616 contains a message type field 641, a message sub-type field 642, a SOM (Start Of Message) field 643, an EOM (End Of Message) field 644, a reserved bits field 645, a message ID field 646, a sequence ID field 647, a data length ID field 648, and reserved bytes 649.

An IP address in the IP header 612 is used to send the data packet 600 to a destination address. Information in the transport protocol header 614 is used to specify the protocol being used to transport the data packet 600. The data length ID field 648 contains information on the size of the message data 618.

The SOM field 643 and the EOM field 644 are used to provide messaging that spans multiple data packets. The SOM field 643 indicates whether the data packet 600 is at the start of a message and the EOM field 644 indicates whether the data packet 600 is at the end of the message. The following are example combinations of the SOM field 643 and the EOM field 644: 1) SOM=1 and EOM=0 indicate that the data packet 600 is the first data packet in the message; 2) SOM=0 and EOM=1 indicate that the data packet 600 is the last data packet in the message; 3) SOM=1 and EOM=1 indicate that the data packet 600 is the only data packet in the message; and 4) SOM=0 and EOM=0 indicate that the data packet 600 is an intermediate data packet in the message.

The message type field 641 indicates the type of message being sent. The types of messages include: 1) UserRequest; 2) UserRequestAck; 3) AlertMessage; 4) AlertMessageNack; 5) ClientKeepAlive; 6) ServerRequest; 7) ServerRequestAck; 8) SeverAlertMsg; 9) ServeAlertMsgAck; 10) ServerKeepAlive; 11) ServertListUpdate; 12) OAMMessages; 13) ServerBackupMsg; 14) ServerJournalMessage; 15) ServerSwitchNotice; and 16) ServerBackupControl, for example. Each of these message types is listed in Table III. In Table III, for each message type there is provided information on the sender, the receiver, the transport protocol being used, and whether the message is to be acknowledged.

TABLE III

Listing of message types along with the sender, receiver, transport protocol, and acknowledgement information for each message type.

| Message Type | Sender | Receiver | Transport Protocol | Acknowledge |
|---|---|---|---|---|
| UserRequest | Client | Server | TCP | Yes |
| UserRequestAck | Server | Client | TCP | No |
| AlertMessage | Server | Client | UDP | No |
| AlertMessageNack | Client | Server | UDP | No |
| KeepAlive | Client | Server | UDP | No |
| ServerAlertMsg | Server | Server | TCP | Yes |
| ServerAlertMsgAck | Server | Server | TCP | No |
| ServerRequest | Server | Central Server | TCP | Yes |
| ServerRequestAck | Central Server | Server | TCP | No |
| ServerListUpdate | Central Server | All Servers | TCP | No |
| ServerKeepAlive | Server | Central Server | TCP | No |

UserRequest messages are used to provide messaging information for user requests. Example types of user requests include, but are not limited to: 1) account creation where a user creates an account or where an administrator creates an account for an issuer of alerts; 2) subscription where a user subscribes for receiving alerts; 3) registration where a client or alert server acquires access to the Internet; 4) requests for modifications where a user requests modifications of account and/or subscription information; 5) deletion of subscription where a user un-subscribes from a subscription to receive alerts; and 6) control messaging for any other suitable request. The type of user request is specified in the message sub-type field 642. For an account creation user request, the message data 618 includes user information such as a user name, password, the city in which the user resides, and the user's ZIP code or postal code, for example. For a subscription user request or a user request to modify an existing subscription, the message data 618 includes one or more alert regions, one or more types of alert to which to the user wants to subscribe, and the level of severity of the alerts, for example. For a registration user request or an account deletion request, the message data 650 includes user information such as a user name and password, for example.

UserRequestAck messages are sent from an alert server to a client device to acknowledge receipt of UserRequest messages. Both UserRequest and UserRequestAck messages are exchanged over a Secure Socket Layer (SSL) on TCP. The SSL communication provides security for these messages by using public key cryptography, for example.

A message of type AlertMessage is used by an alert server to alert client devices of an alert. The message data 618 of such a message contains a sender ID, a date of time that the alert is sent, information on the scope of distribution, the language in which the alert is to be presented, the urgency of the alert, the level of severity of the alert, the region of origin of the alert, and a mime type, for example. A message of type AlertMessageNack is used by client devices to inform the alert servers when one or more data packets from a message of type AlertMessage are missing. As will be discussed in detail below, in some implementations the messages of types AlertMessage and AlertMessageNack are exchanged over UDP.

ClientKeepAlive type messages are sent from a client device to an alert server using UDP. These messages are sent at about every 15 minutes, for example, to notify the alert server to maintain communications with the client device. In some implementations the message data 618 in such messages contains information on alerts that have been received by the user device. This information includes the number of alerts received and identifiers of the alerts received, for example. The alert server makes use of this information to determine whether the client device has received all alerts.

ServerRequest and ServerRequestAck type messages are exchanged over TCP connections between a central alert server and another alert server. The message data 618 in such messages contains an alert server identifier, for example. In some implementations, there are two sub-types for ServerRequest and ServerRequestAck messages, each specified in the message sub-type field 642. The first sub-type of ServerRequest and ServerRequestAck messages are used for registering new alert servers with the central alert server. The second sub-type of ServerRequest and ServerRequestAck messages are used to remove alert servers from an alerting system.

SeverAlertMsg and ServerAlertMsgAck messages are exchanged between alert servers using TCP to notify the alert servers of issued alerts. The message data 618 of such a message contains a sender ID, a date of time that the alert is sent, information on the scope of distribution, the language in which the alert is to be presented, the urgency of the alert, the level of severity of the alert, the region of origin of the alert, and a mime type, for example.

Each alert server in a system periodically sends a ServerKeepAlive type message to a central alert server using TCP to notify the central alert server to maintain communications. The message data 618 of such a message contains an alert server identifier, for example. The central alert server makes use of the ServerKeepAlive type messages received to update its list of active servers. As discussed above, when there is a change in the list of active servers, due to the addition or removal of a server for example, the central alert server distributes an updated list to the other alert servers over TCP using ServerListUpdate type messages. The message data 618 in ServerListUpdate type data packets contains information on active alert servers such as alert server IDs and IP addresses, for example.

Messages of type OAMMessages (Operation, Administration, and Maintenance Messages) are used to communicate statistics among servers.

Messages of type ServerBackupMsg are sent by a backup alert server to its primary alert server using TCP to notify the primary alert server that the backup alert server is active and ready to provide backup alerting functionality.

A message of type ServerJournalMsg is sent from a primary alert server to its backup alert server, and is used to transfer data and synchronize state information on: i) alerts sent; ii) active and pending alerts; and 3) subscriptions, for example.

A ServerBackupControl type message is sent by a backup alert server to client devices to indicate that the primary alert server is down and that it is to provide backup alerting functionality.

With reference to Table III, UDP is used as a transport protocol for AlertMessage, AlertMessageNack, and KeepAlive type messaging. UDP is employed when sending alerts to increase performance in the use of bandwidth. However, TCP has the benefit of having an inherent mechanism for verifying whether data packets have been received to provide reliable data transport. In particular, with TCP for each data packet sent to a destination there is an ACK (Acknowledgement) message that is returned to acknowledge receipt of the data packet. Approximately 1% to 15% of data packets are lost over the Internet. As such, for each data packet sent over the Internet there is an 85% to 99% probability that an ACK message will be returned. In some implementations UDP is used for alerting subscribers, together with a reliable mechanism for data packet transmission between a client device and an alert server. Such a mechanism will now be described with reference to FIGS. 7A and 7B.

Figure 7A:
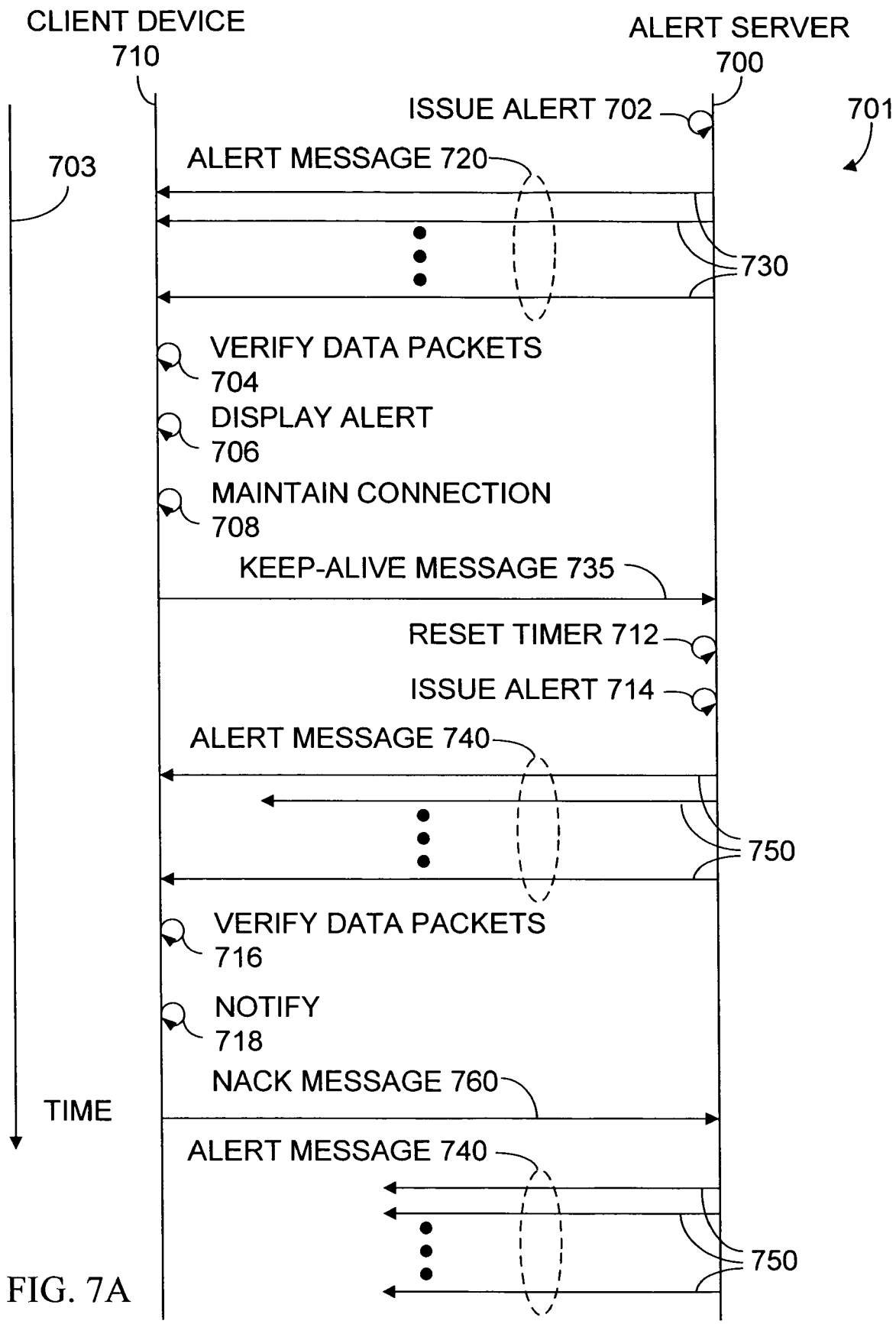
FIG. 7A a messaging flow diagram illustrating the steps and messaging employed by an alert server and a client device for providing reliable alerting functionality in the alert system of FIG. 1.
Figure 7A:
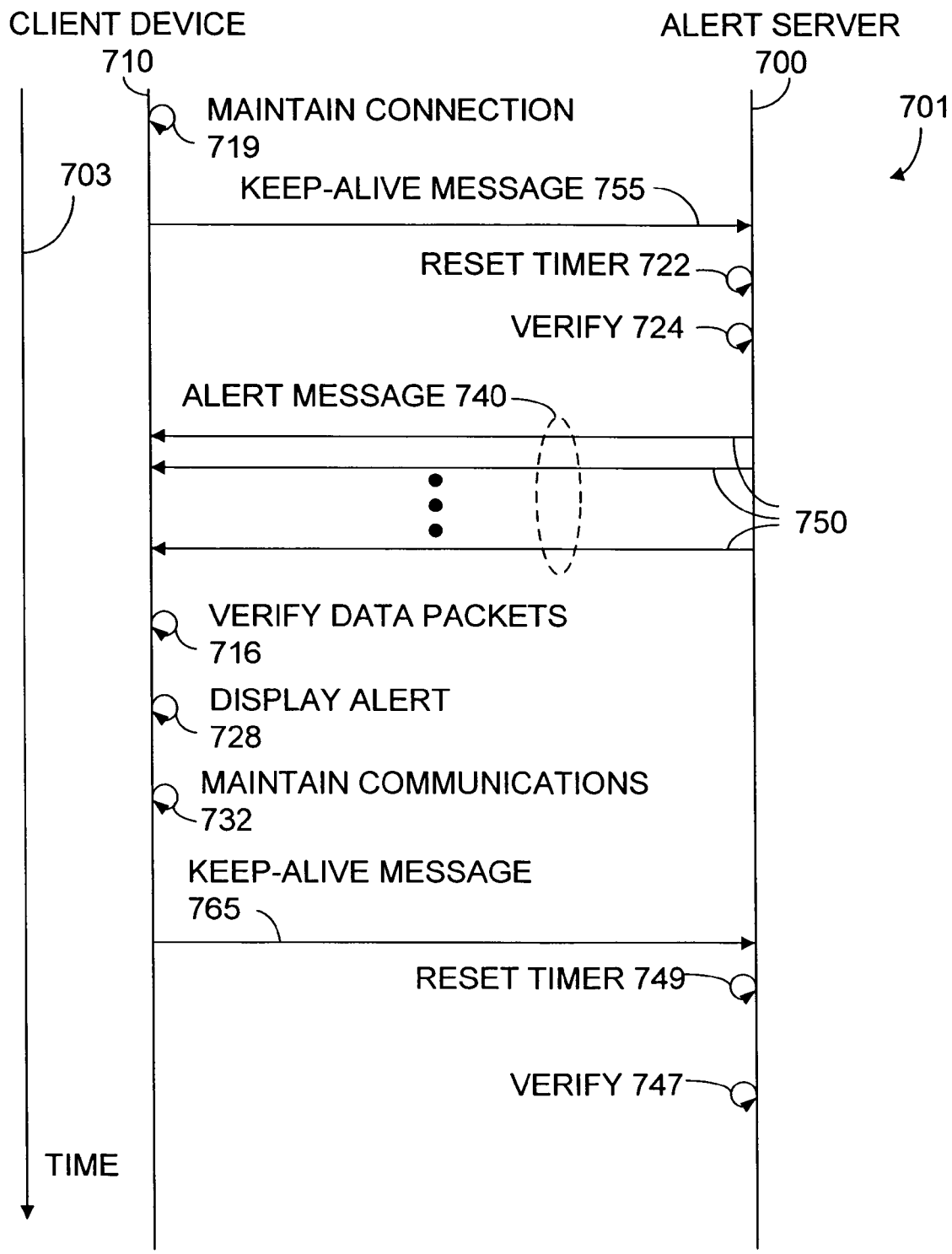

In FIG. 7A, shown is a messaging flow diagram 701 illustrating the steps and messaging employed by an alert server 700 and a client device 710 in providing reliable alerting functionality in the alert system 100 of FIG. 1. The alert server 700 and the client device 710 represent any suitable alert server and client device, respectively, within any one of geographic region 120, 121, 122 of FIG. 1. For example, alert server 700 and the client device 710 are shown as the alert server 110 and the PC 150, respectively, in geographic region 120. The steps in FIG. 7A involve communications between the client device 710 and the alert server 700. An arrow 703 indicates a timeline. Furthermore, in the flow diagram 701, with the exception of the arrow 703 all straight arrows represent messages between the client device 710 and the alert server 700. Curved arrows indicate steps performed at the client device 710 and the alert server 700.

The alert server 700 issues 702 an alert in response to a request to issue the alert by sending an alert message 720 containing a sequence of data packets 730 to the client device 710. When the alert message 720 is received, the client device 710 verifies 704 whether all data packets 730 have been received. Each data packet 730 has a format such as that shown in FIG. 6, and is identified as a first data packet in the alert message 720, the last data packet in the alert message 720, or an intermediate data packet using the SOM field 643 and the EOM field 644. Each data packet 730 is also uniquely identified within the alert message 720 using the sequence ID field 647. Furthermore, each data packet 730 is identified as being part of the alert message 720 using the message ID field 646. All data packets 730 in the alert message 720 have the same entry in the message ID field 646. Furthermore, the SOM field 643, the EOM field 644, and the sequence ID field 647 are used by the client device 710 to determine the number of data packets 730 to be received, and whether they have all been received. In the example of FIG. 7A, all data packets 730 are received, and the client device 710 displays 706 the alert. The client device 710 also maintains 708 the connection with the alert server 710 by sending to the alert server 700 a Keep-Alive message 735 containing information to confirm that the alert message 720 has been received. Responsive to receiving the Keep-Alive message 735 the alert server 700 resets 712 a timer for a connection with the client device 710. The alert server 700 issues 714 another alert in response to another request by sending an alert message 740 containing a sequence of data packets 750 to the client device 710. The client device 710 verifies 716 whether all of the data packets 750 have been received. However, in this case one or more of the data packets 750 have not been received, and the client device 710 notifies 718 the alert server 700 of the missing data packet(s) by sending a NACK message 760 to the alert server 700 indicating that not all of the data packets 750 of the alert message 740 have been received. The alert server 700 sends the alert message 740 once again and in this case none of the data packets 750 are received by the client device 710. This is due to network congestion, for example. In such a case there is no NACK message or any confirmation message being received by the alert server 700. However, as part of a periodic process of maintaining a connection with the alert server 700 and updating the alert server 700, the client device 710 maintains 719 its connection with the alert server 700 and updates the alert server 700 by sending a Keep-Alive message 755 containing information on alerts received. Responsive to receiving the Keep-Alive message 755 the alert server 700 resets 722 a timer and verifies 724 whether the client device 700 has received the alert message 740 using the information contained in the Keep-Alive message 755. In this case, the client device 710 has not received the alert message 740, and the alert server 700 sends the alert message 740 to the client device 710 once again. This time, however, the alert message 740 reaches the client device 710. The client device 710 verifies 716 that all data packets 750 in the alert message 740 have been received and displays 728 the alert. The client device 710 then sends a Keep-Alive message 765 containing information confirming receipt of the alert to the alert server 700. The alert server 700 resets 749 the timer and verifies 747 that the alert message 740 has indeed been received.

In the implementation of FIG. 7A, with a data packet loss rate of 1% to 15% there is approximately a 1% to 15% probability that a NACK message will be sent for each alert message that is sent. This considerably reduces the amount of traffic over the Internet when compared to the above ACK messaging mechanism employed using TCP where an ACK message is sent for each data packet received. In addition, by monitoring the alerts received the alert server 700 provides a reliable mechanism for alert dissemination.

Figure 7B:
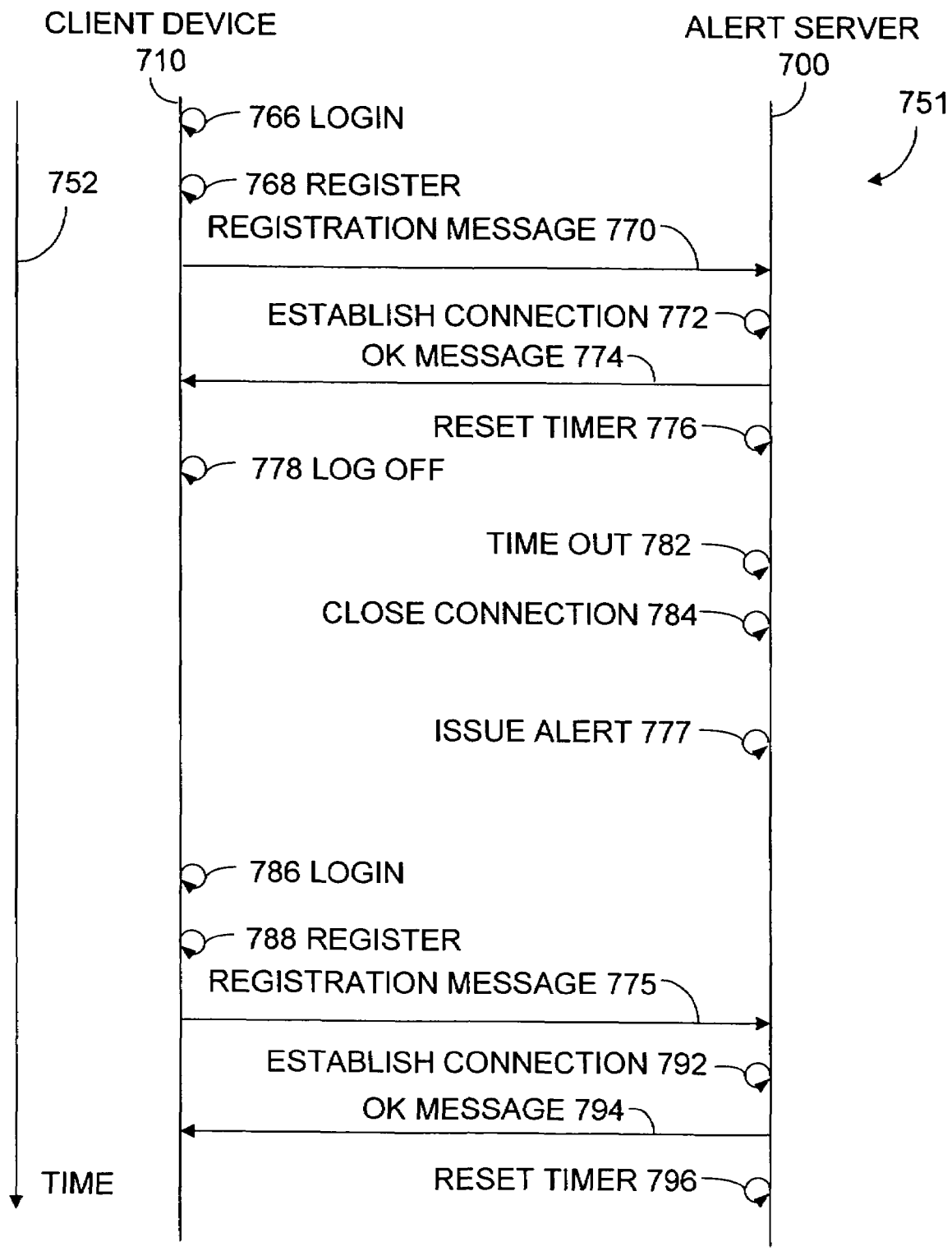
FIG. 7B is a messaging flow diagram illustrating the steps and messaging employed by the alert server and the client device of FIG. 7A for providing reliable alerting functionality during registration; and, FIG. 8 is a messaging flow diagram illustrating the steps and messaging employed by an alert server, a backup alert server, and a PC of the alert system of FIG. 1 for providing backup alerting functionality.
Figure 7B:
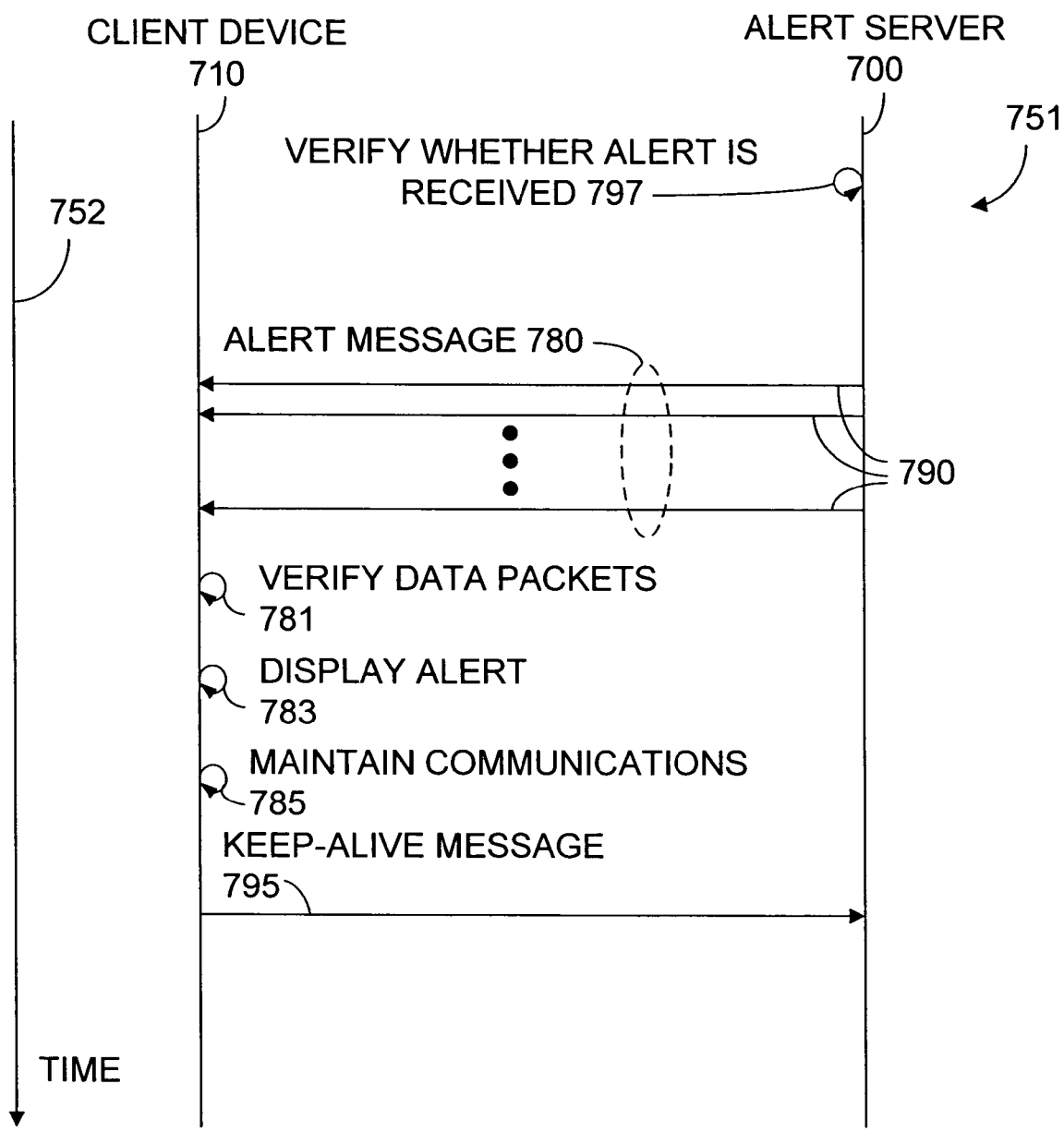

Furthermore, by monitoring the alerts received, the alert server 700 also maintains a listing of subscribers that have not yet confirmed receipt of alerts, and in some instances re-sends the alerts for reliable delivery of the alerts. Such a mechanism will now be described with reference to FIG. 7B. In FIG. 7B, shown is a messaging flow diagram 751 illustrating the steps and messaging employed by the alert server 700 and the client device 710 of FIG. 7A for providing reliable alerting functionality during registration. The steps in FIG. 7B involve communications between the client device 710 and the alert server 700. In FIG. 7B, an arrow 752 indicates a timeline. Furthermore, in the flow diagram 751, with the exception of the arrow 752 all straight arrows represent messages between the client device 710 and the alert server 700. Curved arrows indicate steps performed at the client device 710 and the alert server 700.

A user at the client device 710 logs in 766, and the client device 710 registers 768 with alert server 700 for receiving alerts by sending a registration message 770 to the alert server 700. Responsive to receiving the registration message 770 the alert server 700 establishes 772 a connection with the client device 710 by sending an OK message 774 to the client device 710. The user at the client device 710 later logs off 778. Following the log off 778 the connection with the client device 710 times out 782 at the alert server 700, and the connection with the client device 710 is closed 782. In response to a request to issue an alert the alert server 700 issues 777 the alert to client devices (not shown), which are connected to the alert server 700. However, in this case the there is no connection with the client device 710, and no message is sent to the client device 710. The user at client device 710 later logs in 786 and the client server 710 registers 788 with the alert server 700 by sending a registration message 775 to receive alerts. The alert server 700 establishes 792 a connection with the client device 710 by sending an OK message 794 to the client device 710. The alert server 700 resets 796 a timer for the connection with the client device 710. The alert server 700 also verifies 797 whether all alerts have been received, and determines that the alert message 780 has not been received. The alert server 700 then re-sends the alert message 780 to the client device 710. The client device 710 verifies 781 that all of the data packets 790 in the alert message 780 have been received, and displays 783 the alert. The client device 710 then sends a Keep-Alive message 795 containing information confirming receipt of the alert to the alert server 700.

In some implementations, the alert message 780 is encrypted to provide a secure transmission. Furthermore, in some implementations other message types, such as messages from issuers of alerts to alert servers and alert messages between alert servers for example, are also encrypted to provide secure transmission of information.

Figure 8:
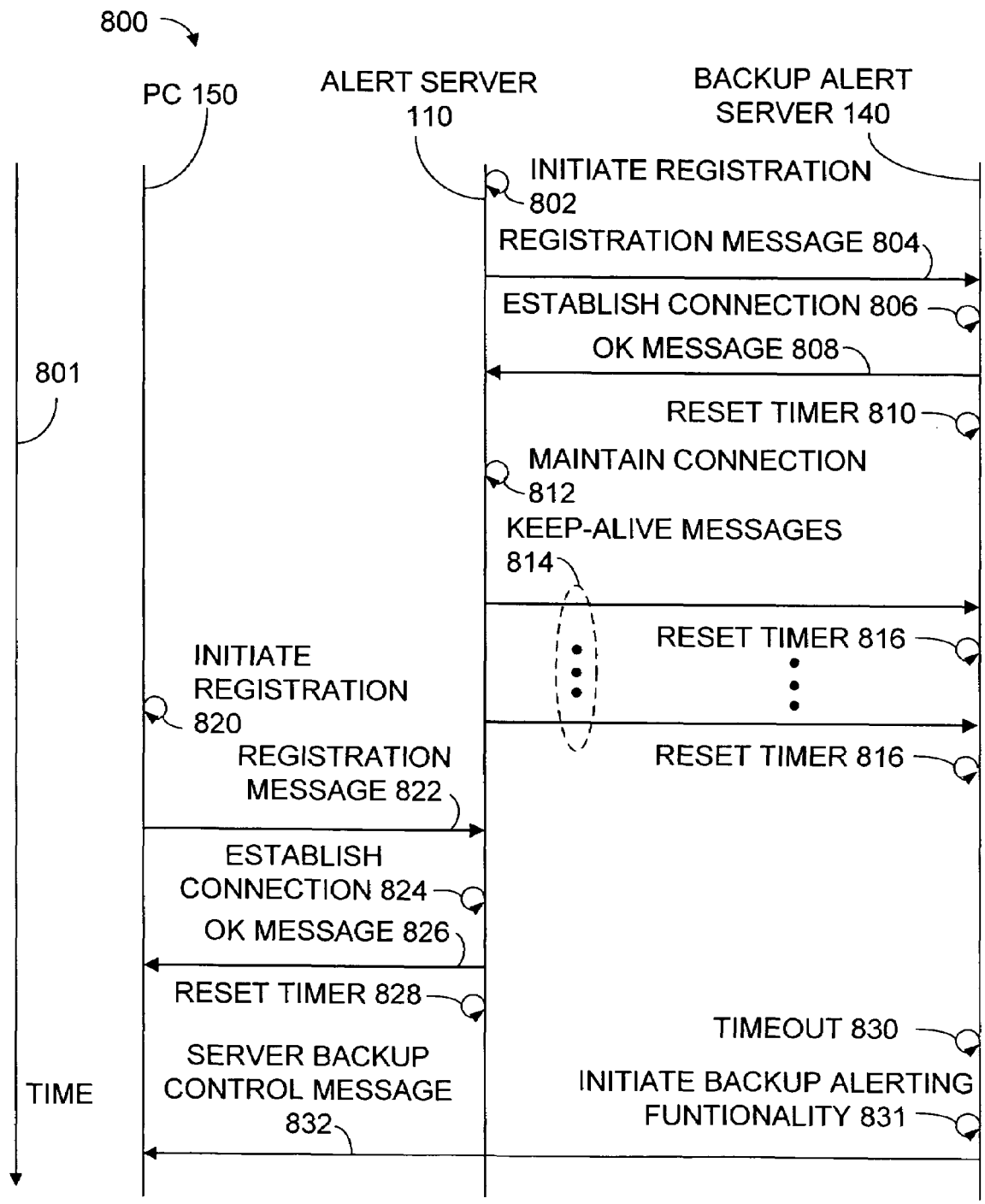
Figure 8:
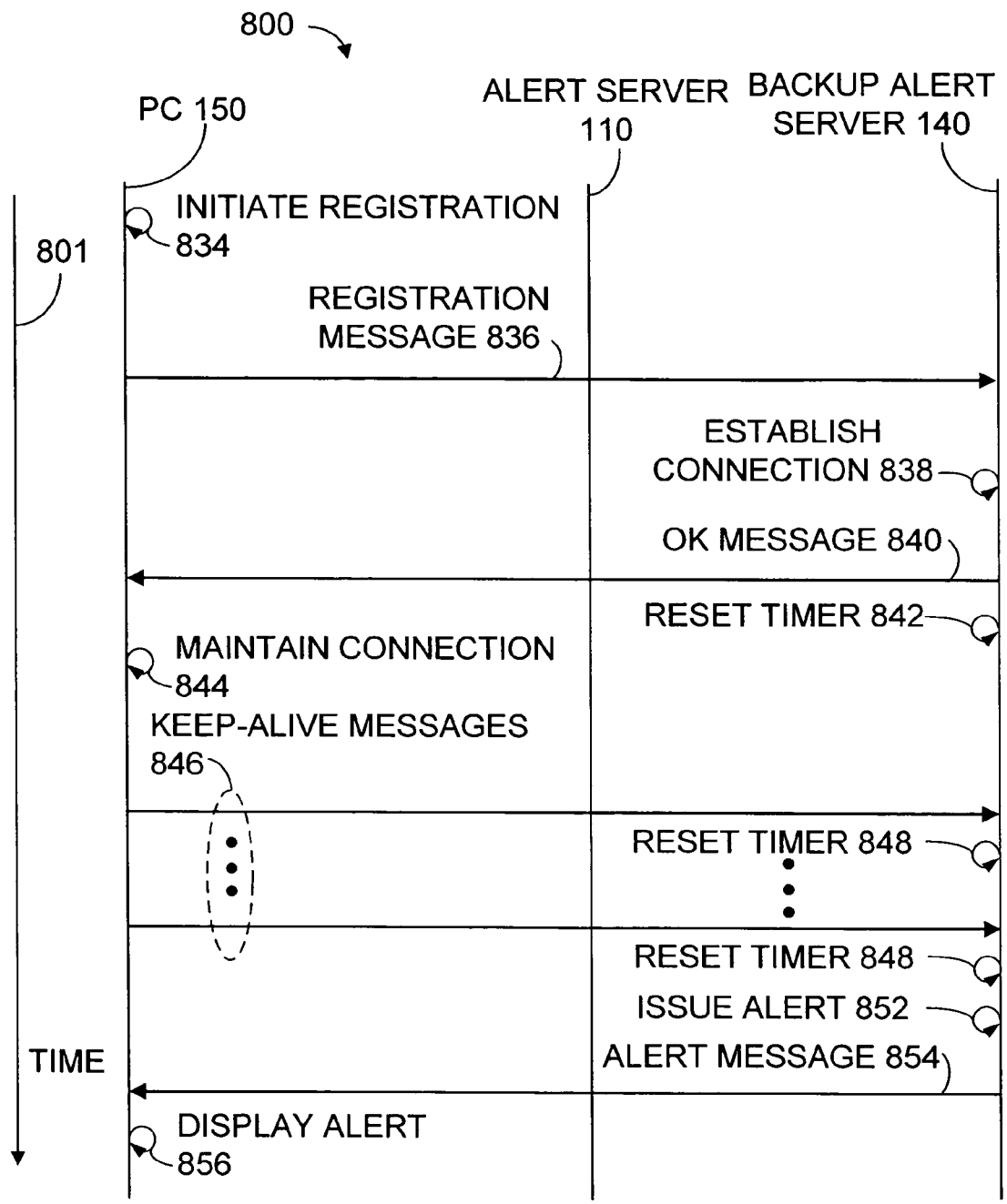

Referring back to FIG. 1, as discussed above the backup alert servers 140, 141, 142 provide backup alerting functionality for alert servers 110, 111, 112, respectively. Further details of this backup functionality will now be described with reference to FIG. 8. In FIG. 8 shown is a messaging flow diagram illustrating the steps and messaging employed by the alert server 110, the backup alert server 140, and the PC 150 of the alert system 100 of FIG. 1 for providing backup alerting functionality. The steps and messaging in FIG. 8 involve communications among the alert server 110, the backup alert server 140, and the PC 150 of FIG. 1. In FIG. 8 an arrow 801 indicates a timeline. Furthermore, in the flow diagram 800, with the exception of the arrow 801 each straight arrow indicates a message between two of the alert server 110, the backup alert server 140, and the PC 150. Curved arrows indicate steps performed at the alert server 110, the backup alert server 140, and the PC 150.

The alert server 110 initiates 802 registration with the backup alert server 140 by sending a registration message 804 to open a connection with the backup alert server 140. In response to receiving the registration message 804 the alert server 140 establishes 806 a connection with the alert server 110 by sending an OK message 808 to the alert server 110. The backup alert server 140 has a timer (not shown) that times out if the backup alert server has not received a Keep-Alive message from the alert server 110 within a predetermined period of time. After establishing the connection with the alert server 110 the alert server 140 resets 810 its timer for the connection with the alert server 110. The alert server 110 maintains 812 its connection with the backup alert server 140 by periodically sending Keep-Alive messages 814 to indicate to the backup alert server 140 that the alert server 110 is still active and provides alerting functionality, and to update the backup alert server 140 with information on subscribers and other active alert servers. Each time one of the Keep-Alive messages 814 is received the backup alert server 140 resets 816 its timer for the connection with the alert server 110. The PC 150 initiates 820 registration with the alert server 110 for receiving alerts in response to a user login by sending a registration message 822. In response to receiving the registration message 822 the alert server 110 establishes 824 a connection with the PC 150 by sending an OK message 826 to the PC 150. The alert server 110 also resets 828 a timer for the connection with the PC 150. In the flow diagram 800 the backup alert server 140 fails to receive one of the Keep-Alive messages 814 within a pre-determined period of time and the timer times out 830. After the timer times out 830 the backup alert server 140 initiates 831 backup alerting functionality by sending a Server Backup Control message 832 to instruct the PC 150 to register with the backup alert server 140. The PC 150 initiates 834 registration with the backup alert server 140 by sending a registration message 836 for receiving alerts from the backup alert server 140. In response to receiving the registration message 836, the backup alert server 140 establishes 838 a connection with the PC 150 by sending an OK message 840 to the PC 150. The backup alert server 140 then resets 842 a timer for the connection with the PC 150. The PC 150 maintains 844 the connection with the backup alert server 140 by periodically sending Keep-Alive messages 846 to the backup alert server 140. For each Keep-Alive message 846 received the backup alert server 140 resets 848 its timer for the connection with the PC 150. In response to a request to issue an alert the backup alert server 140 issues 852 the alert by sending an alert message 854 to the PC 150. Responsive to receiving the alert message 854 the PC 150 displays 856 the alert.

With reference to FIG. 1, each server 110, 111, 112 is assigned its own backup alert servers 140, 141, 142, respectively. In some implementations, a backup alert server provides backup alerting functionality for more than one alert server. In some implementations the client device detects when the alert server has gone down and registers with the backup alert server to receive alerts from the backup alert server.

Numerous modifications and variations of the present invention are possible in light of the above teachings. It is therefore to be understood that within the scope of the appended claims, the invention may be practised otherwise than as specifically described herein.

The invention claimed is:

1. An alert servers, comprising:
a processor, and a computer readable storage medium having computer readable instructions stored thereon, which, when executed by the processor, form the following:
a security manager for authenticating an issuer of alerts and authorizing said issuer of alerts to issue an alert;
a user manager for keeping track of subscribers authenticated with the alert server for a communication session and maintaining a permanent secure connection with the alert server during the communication session; and an alert managers, comprising:
- i) a receiver unit for receiving requests to issue alerts from the issuer of alerts;
- ii) a peer communications unit for notifying at least one other alert server of the alerts;
- iii) a distribution unit for determining from a plurality of subscribers which of the plurality of subscribers are to receive the alerts; and,
- iv) a transmitter unit for sending alert messages to the subscribers that are to receive the alerts.

2. An alert server according to claim 1 wherein the peer communications unit comprises means for maintaining a list of active alert servers and for distributing the list of active alert servers to the active alert servers and wherein each active alert server comprises means for managing a database of subscribers assigned to the active alert server.

3. An alert server according to claim 1 wherein the peer communications unit comprises means for updating the list of active alert servers to include an other alert server in response to receiving a registration request from the other alert server.

4. An alert server according to claim 3 comprising an administration manager for assigning to the other alert server another plurality of subscribers to be alerted by the other alert server.

5. An alert server according to claim 3 comprising an administration manager for assigning to the other alert server a geographic region over which the other alert server is to provide alerting functionality.

6. An alert server according to claim 1 wherein the alert manager comprises a backup unit for providing backup alerting functionality on behalf of another alert server.

7. An alert server according to claim 1 wherein the user manager is enabled to receive subscription requests from the plurality of subscribers, each subscription request containing a respective request to receive alerts of a particular scope of distribution, the particular scope of distribution comprising at least one of a type of alert, a level of severity, and a geographic scope:
   wherein the alert manager comprises a distribution unit for:
   for each subscription request received from a subscriber, sending alerts within the particular scope of distribution to the subscriber provided that the subscriber is in connection with the alert server.

8. An alert server according to claim 1 wherein the user manager is enabled to receive subscription requests from the plurality of subscribers, each subscription request containing a respective request to receive alerts of a particular level of severity:
   wherein the alert manager comprises a distribution unit for:
   for each subscription request, sending alerts having the particular level of severity and alerts having a level of severity higher than the particular level of severity.

9. An alert server according to claim 1 wherein the user manager is enabled to receive subscription requests from the plurality of subscribers, each subscription request containing a respective request to receive alerts of a particular geographic scope,
   wherein the alert manager comprises a distribution unit for:
   for each subscription request, sending alerts having the particular geographic scope and alerts having a larger geographic scope that covers the particular geographic scope.

10. An alert server according to claim 1 wherein the security manager for authenticating and authorizing the issuer of alerts determines whether the issuers of alerts has a necessary security clearance level to issue the alerts, and instructs the alert manager to issue the alerts in response to the determination that the issuers of alerts has the necessary security clearance level.

11. An alert server according to claim 1 wherein the alert manager comprises a UDP (User Datagram Protocol) unit for sending the alert messages using a UDP-based transport protocol.

12. An alert server according to claim 11 wherein each alert message comprises a plurality of data packets and wherein the alert manager comprises a NACK (Negative ACKnowledgement) unit for sending the alert message to a client device in response to receiving a NACK message from the client device indicating that at least one of the data packets have not been received.

13. An alert server according to claim 1 wherein the alert manager comprises a messaging reliability unit comprising:
   i) means for receiving a message containing alert information from a client device;
   ii) means for determining whether the client device has received the alert message using the alert information; and,
   iii) means for re-sending the alert message to the client device in response to a determination that the client device has not received the alert message.

14. An alert server according to claim 1 wherein each alert message comprises alerting information in at least one of a plurality of media formats consisting of a text media format, a video media format, and an audio media format.

15. An apparatus for receiving alerts comprising:
   a) a registration handler having a processor and a memory containing program instructions executable by the processor for alerting, the registration handler comprising:
      i) an account creation unit for creating a user account with an alert server in response to receiving instructions to create the user account with the alert server; and,
      ii) a subscription unit for subscribing with the alert server to receive alerts;
   b) a session registration unit for establishing a communication session with the alert server, including registering with the alert servers, establishing and maintaining a permanent connection with the alert server, and receiving alert messages during the communication session; and
   c) an alert handler for providing alerts in response to receiving the alert messages.

16. An apparatus according to claim 15 wherein the apparatus comprises any one of a PC (Personal Computer), a phone, a cell phone, and a PDA (Personal Digital Assistant).

17. An apparatus according to claim 15 wherein the subscription unit comprises means for subscribing with the alert server to receive alerts having a particular scope of distribution in response to receiving user instructions to receive alerts of the particular scope of distribution.

18. An apparatus according to claim 15 wherein the session registration handler comprises means for registering with a backup alert server to establish a connection with the backup alert server and receive alert messages when the backup alert server provides backup alerting functionality for the alert server.

19. An alert system for a communications network, comprising:
   a plurality of client devices;
   a plurality of alert servers, each for providing alerts to a respective subset of the client devices in response to receiving requests to issue alerts;

each alert server comprising a processor and a computer readable medium having computer readable instructions stored thereof, which, when executed by the processor, form the following:

a security manager for authenticating an issuer of alerts and authorizing said issuer of alerts to issue an alert;

a user manager for keeping track of subscribers authenticated with the alert server for a communication session and maintaining a permanent secure connection with the alert server during the communication session; and an alert manager, comprising:

i) a receiver unit for receiving requests to issue alerts from the issuer of alerts;

ii) a peer communications unit for notifying at least one other alert server of the alerts;

iii) a distribution unit for determining from a plurality of subscribers which of the plurality of subscribers are to receive the alerts; and, iv) a transmitter unit for sending alert messages to the subscribers that are to receive the alerts;

v) a database for storing information on subscribers assigned to said each alert server.

20. A method of alerting comprising:

by an alert server:
  (i) receiving requests to issue alerts from an authenticated issuer of alerts and authorizing said issuer of alerts to issue an alert;
  (ii) notifying at least one other alert server of the alerts;
  (iii) from a plurality of subscribers, determining which of the plurality of subscribers are to receive the alerts from the alert server; and,
  (iv) for the subscribers who are to receive the alerts, keeping track of subscribers authenticated with the alert server for a communication session and maintaining a permanent secure connection with the alert server during the communication session; and
  (v) sending alert messages only to the subscribers identified in the step (iv).

* * * * *